(12) United States Patent
Cao et al.

(10) Patent No.: US 11,760,596 B2
(45) Date of Patent: Sep. 19, 2023

(54) ROLL REPLACING DEVICE AND ADHESIVE TAPE STICKING EQUIPMENT

(71) Applicant: WUXI LEAD INTELLIGENT EQUIPMENT CO., LTD., Jiangsu (CN)

(72) Inventors: Er Cao, Jiangsu (CN); Xiaofei Yang, Jiangsu (CN)

(73) Assignee: WUXI LEAD INTELLIGENT EQUIPMENT CO., LTD., Jiangsu (CN)

(*) Notice: Subject to any disclaimer, the term of this patent is extended or adjusted under 35 U.S.C. 154(b) by 0 days.

(21) Appl. No.: 17/955,834

(22) Filed: Sep. 29, 2022

(65) Prior Publication Data

US 2023/0027935 A1 Jan. 26, 2023

Related U.S. Application Data

(63) Continuation of application No. PCT/CN2021/123869, filed on Oct. 14, 2021.

(30) Foreign Application Priority Data

Feb. 9, 2021 (CN) .......................... 202110175831.2
May 6, 2021 (CN) .......................... 202110490100.7

(51) Int. Cl.
*B65H 19/20* (2006.01)
*B65H 19/18* (2006.01)
(Continued)

(52) U.S. Cl.
CPC ......... *B65H 19/1826* (2013.01); *B65H 19/20* (2013.01); *B65H 35/0013* (2013.01);
(Continued)

(58) Field of Classification Search
CPC ................ B65H 19/20; B65H 19/1826; B65H 35/0013; H01M 10/0431; H01M 10/0409
See application file for complete search history.

(56) References Cited

U.S. PATENT DOCUMENTS 4,190,483 A * 2/1980 Ryan ...................... B65H 19/20
242/552
4,455,190 A * 6/1984 Bianchetto ......... B65H 19/1873
242/552
(Continued)

FOREIGN PATENT DOCUMENTS

CN 203222359 U 10/2013
CN 106006128 A 10/2016
(Continued)

OTHER PUBLICATIONS

International Search Report in International application No. PCT/CN2021/123869, dated Feb. 9, 2022.

*Primary Examiner* — Sang K Kim
(74) *Attorney, Agent, or Firm* — Mark M. Friedman

(57) ABSTRACT

The present application relates to a roll replacing device and an adhesive tape sticking equipment. The roll replacing roll device replacing includes an unwinding member, a roll replacing member, a cutting member, and an end pressing member, which can realize automatic roll replacing of a work strip and a spare strip and reduce staffing, thereby reducing labor cost.

12 Claims, 11 Drawing Sheets

(51) Int. Cl.
*B65H 35/00* (2006.01)
*H01M 10/04* (2006.01)

(52) U.S. Cl.
CPC ... *H01M 10/0409* (2013.01); *H01M 10/0431* (2013.01); *B65H 2301/44336* (2013.01); *B65H 2301/44338* (2013.01); *B65H 2301/46* (2013.01); *B65H 2701/11332* (2013.01); *B65H 2701/19* (2013.01)

(56) References Cited

U.S. PATENT DOCUMENTS

| | | | |
|---|---|---|---|
| 8,002,924 B2* | 8/2011 | Machamer | B65H 19/1836 156/159 |
| 2017/0137247 A1* | 5/2017 | Sato | B65H 19/1842 |
| 2017/0341894 A1* | 11/2017 | Muller | B65H 19/107 |
| 2018/0162668 A1 | 6/2018 | Hong | |

FOREIGN PATENT DOCUMENTS

| | | |
|---|---|---|
| CN | 106006134 A | 10/2016 |
| CN | 106115328 A | 11/2016 |
| CN | 112811225 A | 5/2021 |
| CN | 113233231 A | 8/2021 |
| EP | 3698959 A1 | 8/2020 |

* cited by examiner

ROLL REPLACING DEVICE AND ADHESIVE TAPE STICKING EQUIPMENT

CROSS-REFERENCE TO RELATED APPLICATIONS

This application claims priority to Chinese Patent Application No. 202110175831.2, filed on Feb. 9, 2021, titled "ROLL REPLACING DEVICE AND RUBBERIZING EQUIPMENT", and Chinese Patent Application No. 202110490100.7, filed on May 6, 2021, titled "ROLL REPLACING DEVICE AND RUBBERIZING EQUIPMENT", which are incorporated by reference in their entirety in the present application.

TECHNICAL FIELD

The application relates to a technical field of battery manufacturing, and more particularly, relates to a roll replacing device and an adhesive tape sticking equipment.

BACKGROUND

In a production and manufacturing process of lithium batteries, it is necessary to wind multiple strips (such as a cathode sheet, a separator, and an anode sheet) to form a battery cell. Before a strip enters a winding device to be wound, it is necessary to perform a production process for adhering an adhesive tape on a side of the strip. Of course, in the production and manufacturing process of the lithium batteries, there are many places in need of a process for adhering an adhesive tape, such as adhering a protective adhesive tape on an electrode sheet, adhering the protective adhesive tape on a battery tab, adhering a tail adhesive tape to a tail of a wound battery cell, and so on.

However, in existing technologies, manual roll replacing is adopted. That is, personnel need to be configured during an operation, so that when an adhesive reel is used up, the personnel on duty can replace it in time, resulting in a high labor cost, a long downtime, and a reduced production efficiency. In order to avoid the manual roll replacing, a roll replacing device that can realize automatic roll replacing is generally used to unwind and output the adhesive tape. However, when a conventional roll replacing device switches material rolls, a starting end of a spare strip cannot be adhered to a work strip, so that the starting end of the spare strip is easily adhered to a transition roller in a subsequent strip moving process, which leads to easy falling of the spare strip and the work strip and insecure adhering.

SUMMARY

Based on this, it is necessary to focus on problems that the manual roll replacing has a long downtime, a low production efficiency, and a high labor cost, or that a starting end of a spare strip cannot be adhered to a work strip when a roll replacing device switches strips, which leads to easy falling of the spare strip and the work strip in a subsequent strip moving process and insecure adhering, so as to provide the roll replacing device and an adhesive tape sticking equipment which ameliorate the above defects.

A roll replacing device, comprising:
an unwinding member including a first unwinding mechanism and a second unwinding mechanism for unwinding and outputting a first strip and a second strip respectively;
a roll replacing member arranged downstream of the unwinding member and includes a first roll replacing mechanism and a second roll replacing mechanism that are oppositely arranged, and a roll replacing passage for the first strip and the second strip to pass through formed between the first roll replacing mechanism and the second roll replacing mechanism;
wherein the first roll replacing mechanism is configured to move towards the second roll replacing mechanism to press the first strip and the second strip on the second roll replacing mechanism; the second roll replacing mechanism is configured to move towards the first roll replacing mechanism to press the first strip and the second strip on the first roll replacing mechanism; and
a cutting member used to cut off the first strip or the second strip pressed between the first roll replacing mechanism and the second roll replacing mechanism.

In one embodiment, the first roll replacing mechanism includes a first driving member and a first pushing block. The first driving member is connected to the first pushing block in a driving manner to drive the first pushing block to move towards the second roll replacing mechanism.

In one embodiment, the roll replacing member further includes a first pressing mechanism, the first pressing mechanism includes a first pressing head, and the first pressing head is configured to press and fix the first strip to the first pushing block in a controlled manner.

In one embodiment, the first pressing mechanism further includes a first rotating shaft, a first swing driving member, and a first pressing head base.

The first rotating shaft is rotatably arranged around its own axis and is connected to the first swing driving member in a driving manner, one end of the first pressing head base is connected to the first rotating shaft, and another end of the first pressing head base is mounted with the first pressing head.

In a process that the first rotating shaft drives the first pressing head base to rotate, the first pressing head can press the first strip passing through the roll replacing passage on the first pushing block.

In one embodiment, the first pressing mechanism further includes a first cutter base, a first cutter, and a first elastic member.

One end of the first cutter base is connected to the first rotating shaft, and another end of the first cutter base is mounted with the first cutter; an end of the first pressing head base away from the first pressing head is rotatably connected to the first rotating shaft, and the first elastic member is connected to the first rotating shaft and the first pressing head base, and is used to provide a pretension force that makes the first pressing head base tend to drive the first pressing head to rotate towards the first pushing block.

In a process that the first rotating shaft drives the first cutter base to rotate, the first cutter can cut off the first strip pressed on the first pushing block by the first pressing head.

In one embodiment, the first pressing mechanism further includes a first moving driving member and a first mounting base.

The first pressing head is mounted on the first mounting base. The first mounting base is mounted on a driving end of the first moving driving member to be driven by the first moving driving member to move along a first direction, and to drive the first pressing head to move close to or away from the first pushing block.

In one embodiment, the first pressing mechanism further includes a first cutter member, and the first cutter is arranged on the first mounting base.

The first pressing head is movably connected to the first mounting base along the first direction, and the first elastic member abuts against the first pressing head and the first mounting base to provide a pretension force that makes the first pressing head tend to move towards the first pushing block along the first direction.

In one embodiment, the first pushing block has a first winding surface for the first strip passing through the roll replacing passage to wind around, and the first winding surface is arranged corresponding to the first pressing head, so that the first pressing head can press the first strip on the first winding surface.

In one embodiment, the first pushing block also has a first pressing surface as its side surface facing towards the second roll replacing mechanism, and the first winding surface is connected to an end of the first pressing surface at an output end of the roll replacing passage.

An end of the first pressing surface at an input end of the roll replacing passage is provided with a first guide roller, and/or an end of the first pressing surface at the output end of the roll replacing passage is provided with a second guide roller.

The first guide roller and the second guide roller are used to guide the first strip.

In one embodiment, the first pushing block has a first winding surface for the first strip passing through the roll replacing passage to wind around, and the first winding surface is configured to suction the first strip to wind around.

In one embodiment, the first roll replacing mechanism further includes a first clamping mechanism, the first clamping mechanism includes a first clamping driving member and a first clamping block connected to the first clamping driving member in a driving manner, and the first clamping block is arranged corresponding to an input end of the roll replacing passage, and clamps the first strip pressed between the first roll replacing mechanism and the second roll replacing mechanism under a drive of the first clamping driving member.

The cutting member is used to cut off the first strip from a position between the input end of the roll replacing passage and the first clamping block.

In one embodiment, the second roll replacing mechanism includes a second driving member and a second pushing block.

The second driving member is connected to the second pushing block in a driving manner to drive the second pushing block to move towards the first roll replacing mechanism.

In one embodiment, the roll replacing member further includes a second pressing mechanism, the second pressing mechanism includes a second pressing head, and the second pressing head is configured to be able to press and fix the second strip to the second pushing block in a controlled manner.

In one embodiment, the second pressing mechanism further includes a second rotating shaft, a second swing driving member, and a second pressing head base.

The second rotating shaft is rotatably arranged around its own axis and is connected to the second swing driving member in a driving manner, one end of the second pressing head base is connected to the second rotating shaft, and another end of the second pressing head base is mounted with the second pressing head.

In a process that the second rotating shaft drives the second pressing head base to rotate, the second pressing head can press the second strip passing through the roll replacing passage on the second pushing block.

In one embodiment, the second pressing mechanism further includes a second cutter base, a second cutter, and a second elastic member.

One end of the second cutter base is connected to the second rotating shaft, and another end of the second cutter base is mounted with the second cutter; an end of the second pressing head base away from the second pressing head is rotatably connected to the second rotating shaft, and the second elastic member is connected to the second rotating shaft and the second pressing head base, and is used to provide a pretension force that makes the second pressing head base tend to drive the second pressing head to rotate towards the second pushing block.

In a process that the second rotating shaft drives the second cutter base to rotate, the second cutter can cut off the second strip pressed on the second pushing block by the second pressing head.

In one embodiment, the second roll replacing mechanism further includes a second clamping mechanism, the second clamping mechanism includes a second clamping driving member and a second clamping block connected to the second clamping driving member in a driving manner, and the second clamping block is arranged corresponding to the input end of the roll replacing passage, and clamps the second strip pressed between the first roll replacing mechanism and the second roll replacing mechanism under a drive of the second clamping driving member.

The cutting member is used to cut off the second strip from a position between the input end of the roll replacing passage and the second clamping block.

Regarding the roll replacing device and an adhesive tape sticking equipment mentioned above, when a material roll on the first unwinding mechanism is used up and needs to be replaced, the first unwinding mechanism moves toward the second unwinding mechanism until pressing the first strip and the second strip in the roll replacing passage between the first unwinding mechanism and the second unwinding mechanism, so as to adhere the first strip and the second strip. Then, the cutting member cuts off an end of the first strip connected to the first unwinding mechanism, so as to realize a connection between a work strip (the first strip) and a spare strip (the second strip). Then, the first roll replacing mechanism moves away from the second roll replacing mechanism and resets, and the second strip unwound and output by the second unwinding mechanism passes through the roll replacing passage and is output downstream, that is, realizing a roll replacing.

In this way, the roll replacing device of the present application can realize an automatic switch of the first strip and the second strip (i.e., automatic roll replacing). Compared to a manual roll replacing method adopted in the prior art, it greatly shortens the downtime, improves the production efficiency, eliminates a need for personnel on duty, reduces the staffing, and thus reduces the labor cost.

A roll replacing device, comprising:
an unwinding member used to output a work strip and a spare strip;
a roll replacing member arranged downstream of the unwinding member and has a roll replacing passage for the work strip and the spare strip to pass through, wherein the roll replacing member can be controlled to press the work strip and the spare strip in the roll replacing passage;
a cutting member used to cut off the work strip pressed by the roll replacing member from an input end of the roll replacing passage; and
an end pressing member arranged downstream of the roll replacing member and includes a first pressing mechanism, a second pressing mechanism, and a support mechanism; a pressing passage for the work strip and the spare strip to pass through formed between the first pressing mechanism and the second pressing mechanism; and the support mechanism able to be controlled to extend into or exit the pressing passage;

wherein when the support mechanism extends into the pressing passage, the first pressing mechanism or the second pressing mechanism can be controlled to press the spare strip on the support mechanism and cut off the spare strip pressed on the support mechanism; when the support mechanism exits the pressing passage, the first pressing mechanism or the second pressing mechanism can be controlled to move and press a cutting end of the spare strip and the work strip in the pressing passage between the first pressing mechanism and the second pressing mechanism.

In one embodiment, the roll replacing device includes a first state and a second state.

In the first state of the roll replacing device, when the support mechanism extends into the pressing passage, the first pressing mechanism is controlled to press the spare strip on the support mechanism and cut off the spare strip pressed on the support mechanism; when the support mechanism exits the pressing passage, the second pressing mechanism is controlled to move towards the first pressing mechanism and press the cutting end of the spare strip and the work strip in the pressing passage on the first pressing mechanism.

In the second state of the roll replacing device, when the support mechanism extends into the pressing passage, the second pressing mechanism is controlled to press the spare strip on the support mechanism and cut off the spare strip pressed on the support mechanism; when the support mechanism exits the pressing passage, the first pressing mechanism is controlled to move towards the second pressing mechanism and press the cutting end of the spare strip and the work strip in the pressing passage on the second pressing mechanism.

In one embodiment, the first pressing mechanism includes a first driving member, a first moving base, a first pressing block, and a first cutter.

The first driving member is connected to the first moving base in a driving manner to drive the first moving base to move close to or away from the second pressing mechanism, and the first pressing block and the first cutter are arranged on the first moving base.

When the first moving base moves close to the second pressing mechanism, the first moving base drives the first pressing block to press the spare strip on the support mechanism, and drives the first cutter to cut off the spare strip; or, when the first moving base moves close to the second pressing mechanism, the first moving base drives the first pressing block to press the work strip and the cutting end of the spare strip on the second pressing mechanism.

In one embodiment, the first pressing mechanism further includes a first elastic member, the first pressing block is movably connected to the first moving base, and two opposite ends of the first elastic member abut against the first pressing block and the first moving base respectively, and are used to provide a pretension force that makes the first pressing block move towards the second pressing mechanism relative to the first moving base.

The first pressing block has a first anti-collision groove for the first cutter to pass through.

In one embodiment, a downstream end of the first pressing block is provided with a first wheel.

In one embodiment, the second pressing mechanism includes a second driving member, a second moving base, a second pressing block, and a second cutter.

The second driving member is connected to the second moving base in a driving manner to drive the second moving base to move close to or away from the first pressing mechanism, and the second pressing block and the second cutter are arranged on the second moving base.

When the second moving base moves close to the first pressing mechanism, the second moving base drives the second pressing block to press the spare strip on the first pressing mechanism; or, when the second moving base moves close to the first pressing mechanism, the second moving base drives the second pressing block to press the work strip and the cutting end of the spare strip on the first pressing mechanism.

In one embodiment, the second pressing mechanism includes a second elastic member, and the second pressing block is movably connected to the second moving base, and two opposite ends of the second elastic member abut against the second pressing block and the second moving base respectively, and is used to provide a pretension force that makes the second pressing block move towards the first pressing mechanism relative to the second moving base.

The second pressing block has a second anti-collision groove for the second cutter to pass through.

In one embodiment, a downstream end of the second pressing block is provided with a second wheel.

In one embodiment, the support mechanism includes a third driving member and a support base.

The third driving member is connected to the support base in a driving manner to drive the support base to move and extend into or exit the pressing passage.

In one embodiment, the support mechanism further includes a mounting plate, the mounting plate is connected to the third driving member in a driving manner, and the support base is mounted at an end of the mounting plate facing towards the pressing passage.

The mounting plate is provided with a first transition roller for the work strip to wind around.

In one embodiment, a plurality of second transition rollers are arranged upstream of the roll replacing member, and the plurality of second transition rollers are used to guide the work strip and the spare strip into the roll replacing passage.

The cutting member includes a cutting driving member, a cutter base, a third cutter, and a third pressing block, the cutting driving member is connected to the cutter base in a driving manner, the third cutter and the third pressing block are arranged on the cutter base, and the cutter base moves under a drive of the cutting driving member to drive the third pressing block to press the work strip and the spare strip on the corresponding second transition rollers respectively, and to drive the third cutter to cut off the work strip between the input end of the roll replacing passage and the third pressing block.

An adhesive tape sticking equipment includes a roll replacing device as described in any one embodiment as described above.

Regarding the roll replacing device and gluing equipment, the work strip passes through the roll replacing passage and the pressing passage in sequence, and is transported downstream. When preparing a strip, firstly, the spare strip is pulled to pass through the roll replacing passage and pass through the pressing passage along the second pressing mechanism. Then, the support mechanism is controlled to extend into the pressing passage. Then, the second pressing mechanism is controlled to press the spare strip on the support mechanism, and the spare strip is cut off.

During roll replacing, first of all, the roll replacing member presses the work strip and the spare strip in the roll replacing passage, so that the parts of the work strip and the spare strip in the roll replacing passage are adhered to each other. The cutting member cuts off the work strip at the input end of the roll replacing passage. Then, the second pressing mechanism is controlled to separate from the support mechanism to relieve the pressing towards the spare strip. Then, the support mechanism is controlled to exit the pressing passage. At this time, a cut-off part of the spare strip can be taken away. The cutting end of the spare strip (that is, a starting end of the spare strip passing through the roll replacing passage) is located on the second pressing mechanism. Then, the first pressing mechanism is controlled to move towards the second pressing mechanism to press the cutting end of the spare strip and the work strip on the second pressing mechanism, so that the cutting end of the spare strip is adhered to the work strip. Finally, the first pressing mechanism is controlled to move away from the second pressing mechanism and resets, and the roll replacing member is controlled to release the pressing towards the work strip and the spare strip. At this time, the spare strip can be transported downstream along with the work strip, that is, the spare strip output by the unwinding member is converted into the work strip.

In this way, the roll replacing device of the present application can realize an automatic switch (i.e., automatic roll replacing) between the work strip and the spare strip, and can use the end pressing member to press and adhere the cutting end of the spare strip with the work strip during a roll replacing process, so that the spare strip and the work strip are firmly adhered. This avoids falling of the spare strip and the work strip due to that the cutting end of the spare strip is easy to be adhered to a transition roller in a subsequent strip moving process.

BRIEF DESCRIPTION OF DRAWINGS

In order to more clearly explain embodiments of the present application or technical solutions in the prior art, the following will briefly introduce the accompanying drawings that need to be used in the description of the embodiments or the prior art. Obviously, the accompanying drawings in the following description are only the embodiments of the present application. For those skilled in the art, other drawings can be obtained according to the disclosed drawings without paying creative labor.

DETAILED DESCRIPTION OF EMBODIMENTS

Figure 1:
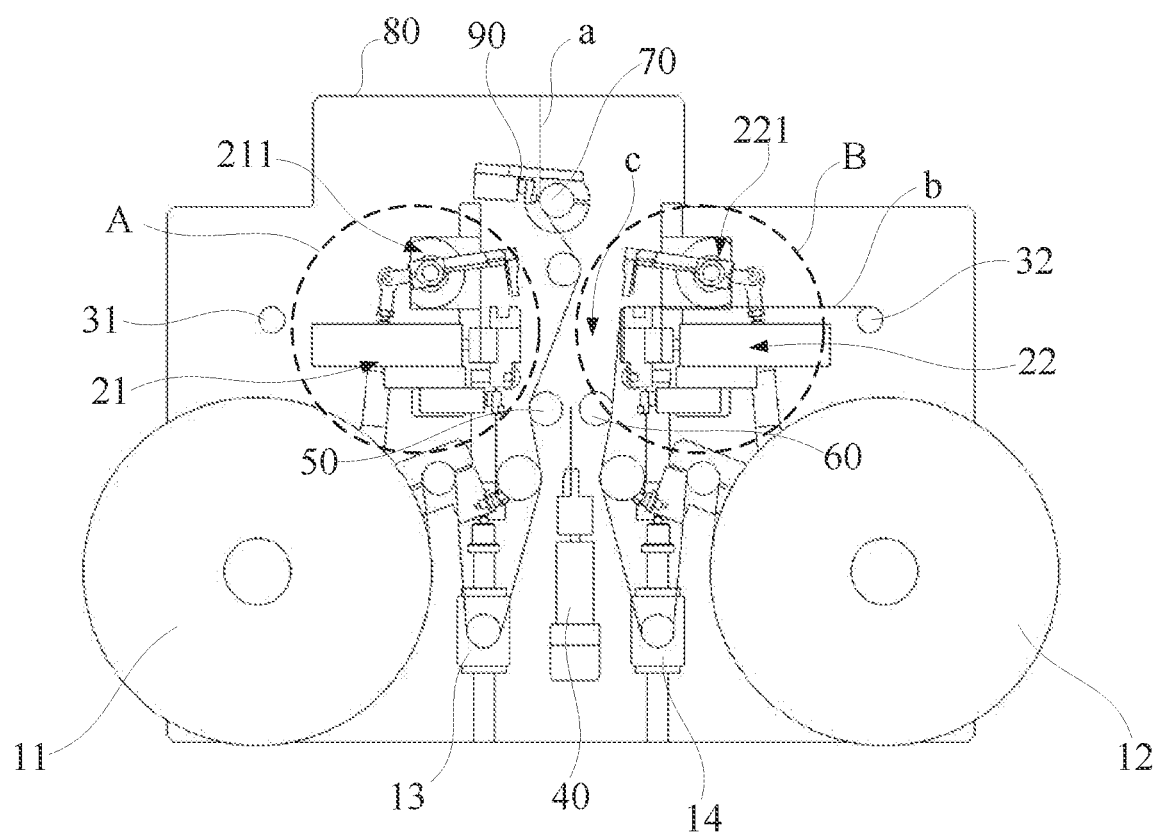
FIG. 1 is a schematic structural diagram of a roll replacing device in an embodiment of the present application.

In order to make the above purpose, features, and advantages of the present application more obvious and understandable, a specific implementation of the present application is described in detail below in combination with the accompanying drawings. Many specific details are set forth in the following description for a full understanding of the present application. However, the present application can be implemented in many ways different from those described herein. Those skilled in the art can make similar improvements without violating the connotation of the present application. Therefore, the present application is not limited by the specific embodiments disclosed below.

In the description of the present application, it should be understood that orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", or the like, is based on azimuth or positional relationship shown in the accompanying drawings, which is only for the convenience of describing the present application and simplifying the description, rather than indicating or implying that devices or elements referred to must have a specific azimuth, or be constructed and operated in a specific azimuth. Thus, the orientation or positional relationship cannot be understood as a limitation of the present application.

In addition, the terms "first" and "second" are only used for descriptive purposes and cannot be understood as indicating or implying relative importance or implicitly indicating the number of indicated technical features. Thus, features defined with "first" and "second" may explicitly or implicitly include at least one of the features. In the description of the present application, "multiple" means at least two, such as two, three, etc., unless otherwise expressly and specifically defined.

In the present application, unless otherwise specified and limited, the terms "mounting", "connection", "coupling", "fixing", etc., should be understood in a broad sense. For example, they can be a fixed connection, a removable connection, or an integral forming; they can be a mechanical connection or an electrical connection; they can be a direct connection or indirect connection through an intermediate medium, or a connection within two elements or an interaction relationship between two elements, unless otherwise expressly limited. For those skilled in the art, the specific meaning of the above terms in the present application can be understood according to specific circumstances.

In the present application, unless otherwise expressly specified and limited, a first feature being "above" or "below" a second feature may be that the first feature directly contacts the second feature or the first feature contacts the second feature through an intermediate medium. Moreover, the first feature being "over", "above", and "on" the second feature may be that the first feature is directly above or obliquely above the second feature, or merely means that a horizontal height of the first feature is higher than that of the second feature. The first feature being "below", "underneath", and "under" of the second feature may be that the first feature is directly below or obliquely below the second feature, or merely means that the horizontal height of the first feature is less than that of the second feature.

It should be noted that when a component is called "fixed to" or "set to" another component, it can be directly on the another component or in the another component. When a component is considered to be "connected" to another component, it can be directly connected to the another component or there may be an intermediate component at the same time. The terms "vertical", "horizontal", "up", "down", "left", "right" and similar expressions used herein are for illustrative purposes only, and do not mean that they are sole embodiments.

Figure 5:
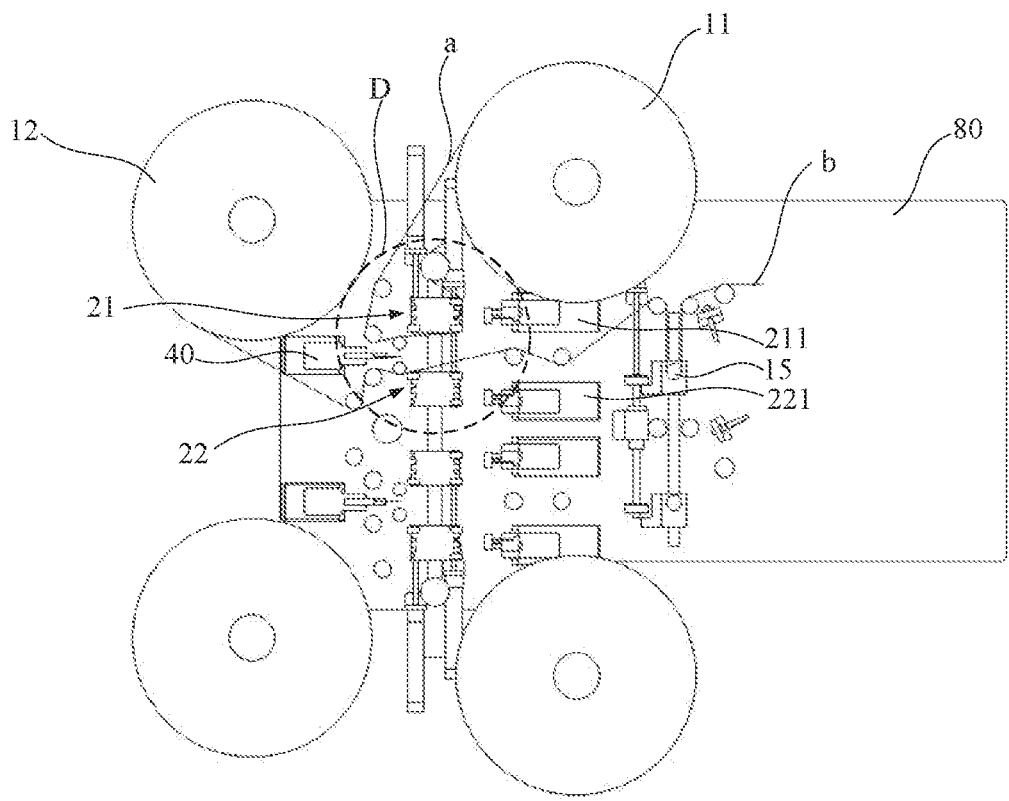
FIG. 5 is a schematic structural diagram of a roll replacing device in another embodiment of the present application.

Please refer to FIGS. 1 and 5, a roll replacing device provided by an embodiment of the present application includes an unwinding member, a roll replacing member, and a cutting member 40.

The unwinding member includes a first unwinding mechanism 11 and a second unwinding mechanism 12. The first unwinding mechanism 11 is used to unwind and output a first strip a, and the second unwinding mechanism 12 is used to unwind and output a second strip b. The roll replacing member is arranged downstream of the unwinding member and includes a first roll replacing mechanism 21 and a second roll replacing mechanism 22 that are oppositely arranged. A roll replacing passage c for the first strip a and the second strip b to pass through is defined between the first roll replacing mechanism 21 and the second roll replacing mechanism 22.

The first roll replacing mechanism 21 is configured to move towards the second roll replacing mechanism 22 to press the first strip a and the second strip b on the second roll replacing mechanism 22. The second roll replacing mechanism 22 is configured to move towards the first roll replacing mechanism 21 to press the first strip a and the second strip b on the first roll replacing mechanism 21.

The cutting member 40 is used to cut off the first strip a or the second strip b pressed between the first roll replacing mechanism 21 and the second roll replacing mechanism 22.

The above roll replacing device is illustrated by taking the first strip a output by the first unwinding mechanism 11 as a work strip, and the second strip b output by the second unwinding mechanism 12 as a spare strip. At this time, the first strip a output by the first unwinding mechanism 11 passes through the roll replacing passage c between the first roll replacing mechanism 21 and the second roll replacing mechanism 22 and is output downstream. The second strip b output by the second unwinding mechanism 12 passes through the roll replacing passage c between the first roll replacing mechanism 21 and the second roll replacing mechanism 22, and winds around the second roll replacing mechanism 22.

When a material roll on the first unwinding mechanism 11 is used up and needs to be replaced, the first roll replacing mechanism 21 moves toward the second roll replacing mechanism 22 until the first strip a and the second strip b in the roll replacing passage c is pressed between the first roll replacing mechanism 21 and the second roll replacing mechanism 22, so as to adhere the first strip a and the second strip b. Then, the cutting member 40 cuts off an end of the first strip a connected to the first unwinding mechanism 11, so as to realize a connection between the work strip (the first strip a) and the spare strip (the second strip b). Then, the first roll replacing mechanism 21 moves away from the second roll replacing mechanism 22 and resets, and the second strip b unwound and output by the second unwinding mechanism 12 passes through the roll replacing passage c and is output downstream, that is, realizing a roll replacing.

It should be noted that a roll replacing process is similar to the above condition under a circumstance that the first strip a unwound and output by the first unwinding mechanism 11 is the spare strip, and the second strip b unwound and output by the second unwinding mechanism 12 is the work strip, and thus will not be repeated here.

In this way, the roll replacing device of the present application can realize an automatic switch (i.e., automatic roll replacing) of the first strip a and the second strip b into the work strip. Compared to a manual roll replacing method adopted in the prior art, it greatly shortens a downtime, improves a production efficiency, eliminates a need for personnel on duty, reduces staffing, and thus reduces labor cost.

It should be noted that the first strip a and the second strip b can be adhesive tapes. Thus, in the roll replacing process, the first strip a and the second strip b pressed between the first roll replacing mechanism 21 and the second roll replacing mechanism 22 can be adhered to each other. Of course, in other embodiments, the first strip a and the second strip b may not be the adhesive tapes. At this time, the first strip a or the second strip b on a roll is adhered with a double-sided adhesive tape, so that the first strip a and the second strip b can be adhered in the roll replacing process.

Specifically, in the embodiment, the roll replacing device further includes a mounting plate 80. The first unwinding mechanism 11, the second unwinding mechanism 12, the first roll replacing mechanism 21, the second roll replacing mechanism 22, and the cutting member 40 are mounted on the mounting plate 80, which is conducive to improving an integration of various mechanisms of the roll replacing device, reducing a volume, and saving a space that needs to be occupied.

Figure 2:
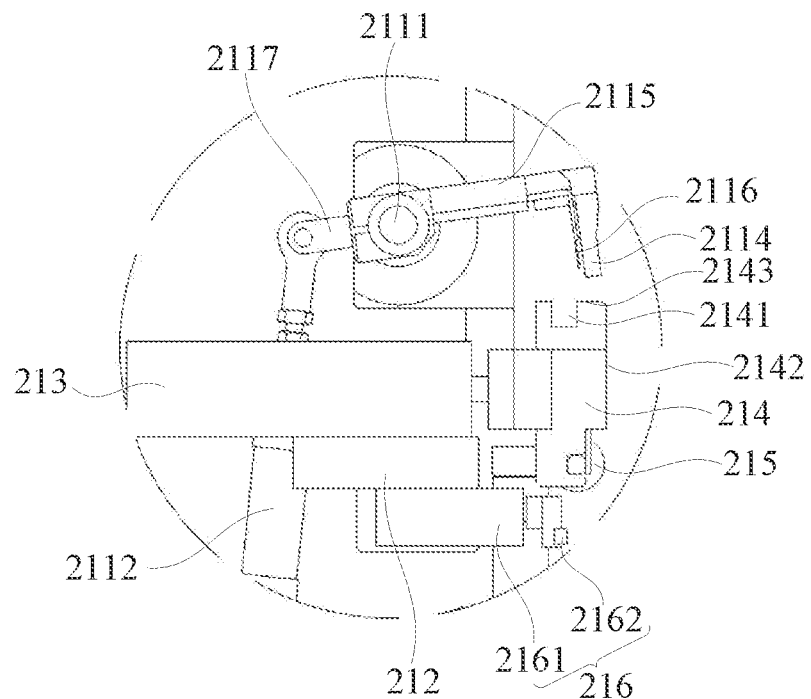
FIG. 2 is a partially enlarged view of position A of the roll replacing device as shown in FIG. 1.
Figure 4:
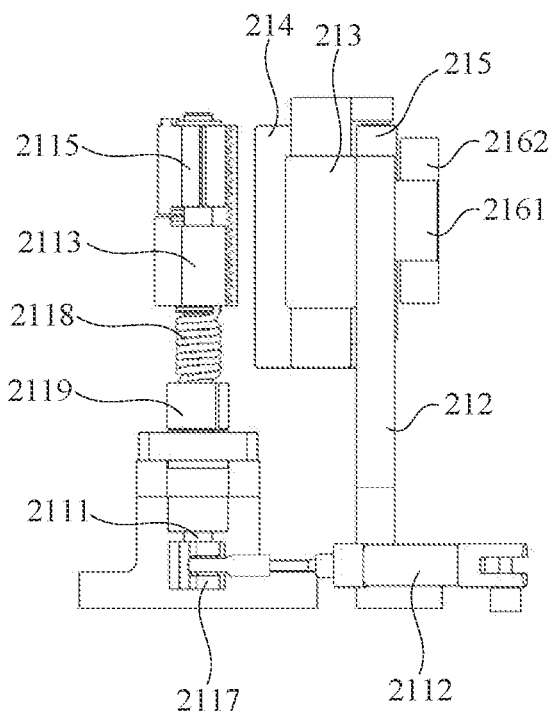
FIG. 4 is a schematic structural diagram of a first roll replacing mechanism of a roll replacing member of the roll replacing device as shown in FIG. 1.

Please refer to FIG. 1, FIG. 2, and FIG. 4, in an embodiment of the present application, the first roll replacing mechanism 21 includes a first fixing base 212, a first driving member 213, and a first pushing block 214. The first fixing base 212 is fixedly connected to the mounting plate 80. The first driving member 213 is mounted on the first fixing base 212 and is connected to the first pushing block 214 in a driving manner to drive the first pushing block 214 to move towards the second roll replacing mechanism 22, so that the first strip a and the second strip b passing through the roll replacing passage c are pressed on the second roll replacing mechanism 22, which makes the first strip a and the second strip b be adhered to each other. It should be noted that when the first strip a is the spare strip, the first strip a passes through the roll replacing passage c and then winds around the first pushing block 214. When the first strip a is the work strip, the first strip a passes through the roll replacing passage c and continues to be transported downstream. Alternatively, the first driving member 213 may be a cylinder.

Further, a first sliding rail can be arranged on the mounting plate 80, and a first sliding block is arranged on the first pushing block 214. The first sliding block slides on and fits with the first sliding rail, so as to guide a movement of the first pushing block 214 close to or away from the second roll replacing mechanism 22. Of course, the first sliding rail and the first sliding block are not necessary. That is, in some embodiments, the first sliding rail and the first sliding block may not be set, and the first pushing block 214 may be directly mounted on a driving end of the first driving member 213.

Please refer to FIG. 1, FIG. 2, and FIG. 4, in an embodiment of the present application, the roll replacing member further includes a first pressing mechanism 211. The first pressing mechanism 211 includes a first pressing head 2114. The first pressing head 2114 is configured to press and fix the first strip a to the first pushing block 214 in a controlled manner. In this way, after the second strip b is switched to the work strip, a new material roll is replaced on the first unwinding mechanism 11. A starting end of the first strip a (at this time, the first strip a is the spare strip) that is unwound by the first unwinding mechanism 11 can be manually passed through the roll replacing passage c and wound around the first pushing block 214. Then, the first pressing head 2114 presses and fixes the first strip a to the first pushing block 214 to prepare for a next roll replacing.

In some embodiments, the first pressing mechanism 211 further includes a first rotating shaft 2111, a first swing driving member 2112, and a first pressing head base 2113.

The first rotating shaft 2111 is rotatably arranged around its own axis and is connected to the first swing driving member 2112 in a driving manner. The first swing driving member 2112 is used to drive the first rotating shaft 2111 to rotate around its own axis. One end of the first pressing head base 2113 is connected to the first rotating shaft 2111, and another end of the first pressing head base 2113 is mounted with the first pressing head 2114.

In a process that the first rotating shaft 2111 drives the first pressing head base 2113 to rotate, the first pressing head 2114 can press the first strip a passing through the roll replacing passage c on the first pushing block 214, so that the first strip a is fixed relative to the first pushing block 214.

Specifically, in the embodiment, the first pressing mechanism 211 further includes a first cutter base 2115, a first cutter 2116, and a first elastic member 2118. One end of the first cutter base 2115 is connected to the first rotating shaft 2111, and another end of the first cutter base 2115 is mounted with the first cutter 2116, so that the first cutter 2116 can rotate with the first rotating shaft 2111. An end of the first pressing head base 2113 away from the first pressing head 2114 is rotatably connected to the first rotating shaft 2111. The first elastic member 2118 is connected to the first rotating shaft 2111 and the first pressing head base 2113. The first elastic member 2118 is used to provide a pretension force that makes the first pressing head base 2113 tend to drive the first pressing head 2114 to rotate towards the first pushing block 214, so that the first pressing head 2114 can drive the first pressing head base 2113 to overcome the pretension force provided by the first elastic member 2118 and rotate relative to the first rotating shaft 2111 under an action of an external force.

In a process that the first rotating shaft 2111 drives the first pressing head base 2113 and the first cutter base 2115 to rotate, the first pressing head 2114 can press the first strip a (i.e., the spare strip) passing through the roll replacing passage c on the first pushing block 214 of the first roll replacing mechanism 21, and the first cutter 2116 can cut off the first strip a pressed by the first pressing head 2114 on the first pushing block 214 of the first roll replacing mechanism 21, so as to ensure that a length of the starting end of the first strip a is consistent during each roll replacing, which is conducive to improving a strip connection effect. Specifically, the first rotating shaft 2111 is rotatably mounted on the mounting plate 80 around its own axis.

In this way, after pulling the first strip a to pass through the roll replacing passage c and to wind around the first pushing block 214, the first swing driving member 2112 drives the first rotating shaft 2111 to rotate, thereby driving the first pressing head 2114 to rotate and approach the first pushing block 214, so as to press the first strip a winding around the first pushing block 214 on the first pushing block 214 of the first roll replacing mechanism 21. At a same time, the first cutter 2116 rotates with the first rotating shaft 2111 and moves close to the first pushing block 214 of the first roll replacing mechanism 21 until the first strip a pressed by the first pressing head 2114 on the first pushing block 214 is cut off, so as to facilitate a subsequent connection between the first strip a and the second strip b, which is conducive to improving the strip connection effect.

When the first strip a winding around the first pushing block 214 needs to be pressed and cut off, firstly, the first swing driving member 2112 drives the first rotating shaft 2111 to rotate, so as to drive the first pressing head 2114 to rotate and approach the first pushing block 214 of the first roll replacing mechanism 21 through the first pressing head base 2113, and to drive the first cutter 2116 through the first cutter base 2115 to rotate and approach the first pushing block 214 of the first roll replacing mechanism 21 at a same time. When the first pressing head 2114 rotates to contact the first strip a on the first pushing block 214 of the first roll replacing mechanism 21 and presses the first strip a on the first pushing block 214 of the first roll replacing mechanism 21, the first rotating shaft 2111 continues to rotate, so as to continue driving the first cutter 2116 through the first cutter base 2115 to rotate and approach the first pushing block 214 of the first roll replacing mechanism 21, until the first cutter 2116 cuts off the first strip a. That is to say, in a process that the first rotating shaft 2111 drives the first pressing head 2114 and the first cutter 2116 to rotate respectively through the first pressing head base 2113 and the first cutter base 2115 and to approach the first pushing block 214 of the first roll replacing mechanism 21, the first pressing head 2114 firstly presses the first strip a on the first pushing block 214 of the first roll replacing mechanism 21, and then the first cutter 2116 contacts the first strip a and cuts off the first strip a, which is conducive to improving quality of a cross-section and a cutting effect.

It should be noted that through rotation of the first rotating shaft 2111, swing of the first pressing head 2114 and the first cutter 2116 around the first rotating shaft 2111 is realized, further realizing the pressing and cutting of the first strip a. Comparing with rectilinear motion, space occupied by the first pressing mechanism 211 is reduced, and a structure of roll replacing device is condensed.

Specifically, in the embodiment, a side of the first pushing block 214 facing towards the first cutter 2116 has a first cutting groove 2141, and the first cutting groove 2141 is defined corresponding to the first cutter 2116. In this way, the first cutter 2116 rotates with the first rotating shaft 2111 and approaches the first pushing block 214 until cutting into the first cutting groove 2141, so as to cut off the first strip a pressed by the first pressing head 2114 on the first pushing block 214, and avoiding damage caused by a contact between the first cutter 2116 and the first pushing block 214.

Alternatively, the first elastic member 2118 may be a torsion spring. The first elastic member 2118 is sleeved on the first rotating shaft 2111. One torque arm of the first elastic member 2118 is connected to the first pressing head base 2113, and another torque arm of the first elastic member 2118 is fixed relative to the first rotating shaft 2111. Further, a first fixing ring 2119 (see FIG. 4) is fixed and sleeved on the first rotating shaft 2111, and the torque arm of the first elastic member 2118 fixedly arranged relative to the first rotating shaft 2111 is connected to the first fixing ring 2119. A first limit plate is fixedly mounted on the first rotating shaft 2111, and the first pressing head base 2113 abuts against the first limit plate under an action of the first elastic member 2118, so as to limit the first pressing head base 2113.

Specifically, in the embodiment, the first swing driving member 2112 includes a first driving body and a first telescopic end that is retractable relative to the first driving body. The first driving body is hinged to the mounting plate 80. The first pressing mechanism 211 further includes a first hinge 2117. One end of the first hinge 2117 is connected to the first rotating shaft 2111, and another end of the first hinge 2117 is hinged with the first telescopic end. In this way, the first telescopic end of the first swing driving member 2112 can be telescoped relative to the first driving body, so that the first rotating shaft 2111 can be driven to rotate through the first hinge 2117, thereby enabling the first pressing head 2114 and the first cutter 2116 to swing around the first rotating shaft 2111, and realizing pressing and cutting of the first strip a. Alternatively, the first swing driving member 2112 may be a cylinder.

It should be noted that a method for enabling the first pressing head 2114 and the first cutter 2116 to swing around the first rotating shaft 2111 is implemented through telescoping of the first telescopic end. Through setting a distance between the first pressing head 2114 and the first cutter 2116, and the first rotating shaft 2111 and a distance between the first telescopic end and the first rotating shaft 2111, the first pressing head 2114 and the first cutter 2116 may be driven by a relatively small retracting stroke of the first telescopic end to press and cut off the first strip a respectively, which further reduces the space required by the first pressing mechanism 211 and improves the structural compactness of the roll replacing device.

It should be noted that the first pressing mechanism 211 is not limited to the first pressing head and the first cutter pressing and cutting off the first strip a in a swinging manner. Please refer to FIGS. 5 to 8, in other embodiments, the first pressing head 2114 and the first cutter 2116 of the first pressing mechanism 211 can also realize the pressing and cutting of the first strip a in the rectilinear movement manner. In this embodiment, the first pressing mechanism 211 further includes a first moving driving member 21121 and a first mounting base 21122. The first pressing head 2114 is mounted on the first mounting base 21122, and the first mounting base 21122 is mounted on a driving end of the first moving driving member 21121 to be driven by the first moving driving member 21121 to move along a first direction, and to drive the first pressing head 2114 to move close to or away from the first pushing block 214, so as to press or release the first strip a winding around the first pushing block 214.

Specifically, in the embodiment, the first pressing mechanism 211 further includes the first cutter 2116 and the first elastic member 2118. The first cutter 2116 is arranged on the first mounting base 21122, so that the first cutter 2116 along with the first mounting base 21122 moves close to or away from the first pushing block 214 along the first direction. The first pressing head 2114 is movably connected to the first mounting base 21122 along the first direction, and the first elastic member 2118 abuts against the first pressing head 2114 and first mounting base 21122 to provide a pretension force that makes the first pressing head 2114 tend to move towards the first pushing block 214 along the first direction. Alternatively, the first moving driving member 21121 may be cylinder. The first elastic member 2118 may be a torsion spring.

In this way, after pulling the first strip a (at this time, the first strip a is the spare strip) to pass through the roll replacing passage c and to wind around the first pushing block 214, the first moving driving member 21121 drives the first mounting base 21122 to move along the first direction towards the first pushing block 214, thereby driving the first pressing head 2114 to move close to the first pushing block 214, so as to press the first strip a winding around the first pushing block 214 on first pushing block 214. At a same time, the first cutter 2116 follows the first mounting base 21122 and moves close to the first pushing block 214 along the first direction, until the first strip a pressed by the first pressing head 2114 on the first pushing block 214 is cut off, so as to facilitate the subsequent connection between the first strip a and the second strip b.

It should be noted that the first moving driving member 21121 is used to drive the first pressing head 2114 and the first cutter 2116 to move along the first direction to realize the pressing and cutting of the first strip a, which simplifies a structure of the first pressing mechanism 211, and makes pressing and cutting actions more stable and reliable.

Further, the first pressing mechanism 211 further includes a first guide rod 21123 and a first limit block 21124. The first mounting base 21122 is defined with a first guide hole. The first guide rod 21123 is arranged to pass through the first guide hole, and slides in and fits with the first guide hole. The first limit block 21124 is fixedly connected to one end of the first guide rod 21123 for avoiding the first guide rod 21123 from falling off from the first mounting base 21122. Another end of the first guide rod 21123 is fixedly connected to the first pressing head 2114. The first elastic member 2118 abuts between the first mounting base 21122 and the first pressing head 2114. In this way, the first guide rod 21123 and the first guide hole are used to guide a movement of the first pressing head 2114, so as to make pressing or releasing actions of the first pressing head 2114 on the first strip a more stable and reliable. It should be noted that the first mounting base 21122 may be defined with a plurality of parallel first guide holes, each of the first guide holes has one first guide rod 21123 to slide in and fit with, ends of all the first guide rods 21123 at one same side of the first mounting base 21122 are all fixedly connected to the first limit block 21124, and ends of all the first guide rods 21123 at another side of the first mounting base 21122 are all fixedly connected to the first pressing head 2114. In this way, the plurality of first guide rods 21123 guide a movement of the first pressing head 2113, so as to further improve stability and reliability of the pressing or releasing actions by the first pressing head 2114 on the first strip a.

Figure 6:
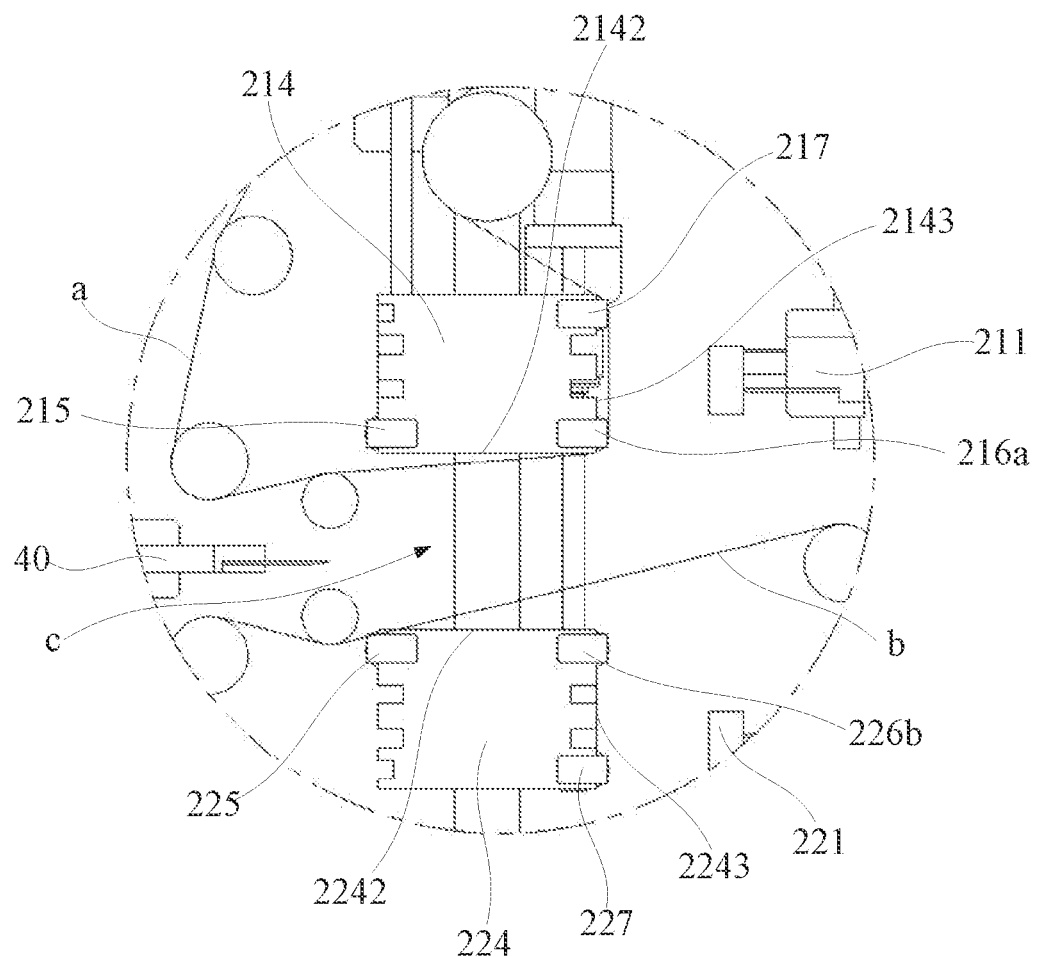
FIG. 6 is a partially enlarged view of position D of the roll replacing device as shown in FIG. 5.
Figure 7:
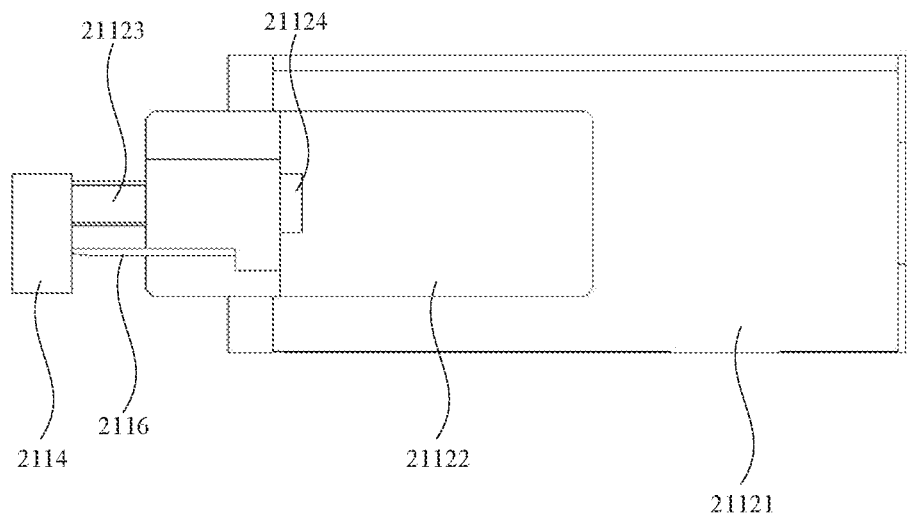
FIG. 7 is a schematic structural diagram of a first pressing mechanism of the roll replacing device as shown in FIG. 5.
Figure 8:
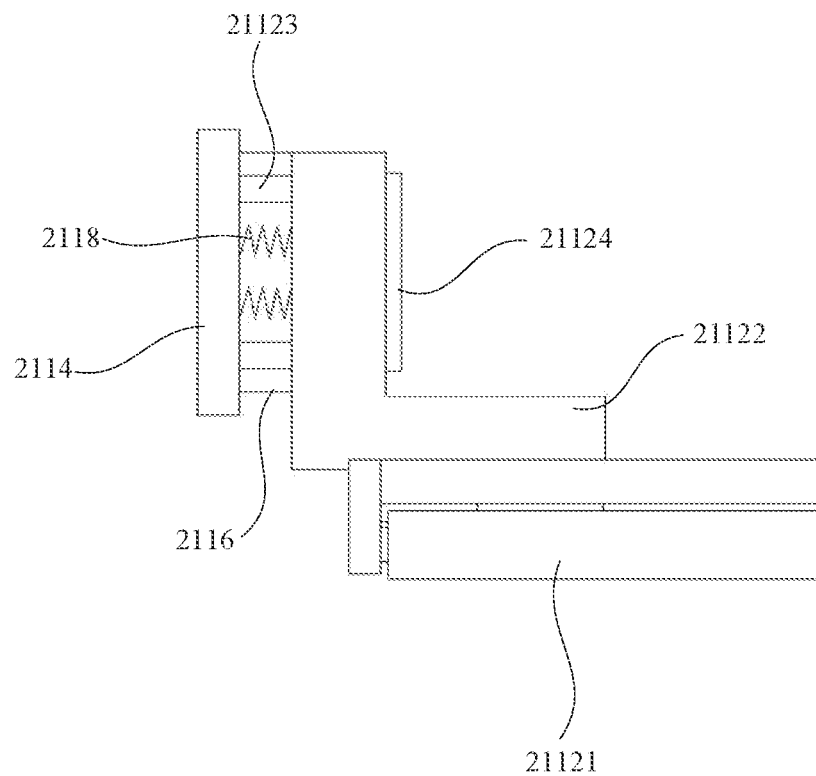
FIG. 8 is a schematic structural diagram of the first pressing mechanism as shown in FIG. 7 from another perspective.

Please refer to FIG. 2 and FIG. 6, in an embodiment of the present application, the first pushing block 214 has a first winding surface 2143 for the first strip a passing through the roll replacing passage c to wind around. The first winding surface 2143 is arranged corresponding to the first pressing head 2114, so that the first pressing head 2114 can press the first strip a on the first winding surface 2143. In this way, when the starting end of the first strip a needs to be pressed and cut off, the first pressing head 2114 and the first cutter 2116 swing or move towards the first winding surface 2143 of the first pushing block 214 under a drive of the first swing driving member 2112 or the first moving driving member 21121, which firstly makes the first pressing head 2114 contacts the first strip a and presses the first strip a on the first winding surface 2143, and then makes the first cutter 2116 contacts the first strip a pressed on the first winding surface 2143 and cut off the first strip a.

Specifically, in the embodiment, the first pushing block 214 also has a first pressing surface 2142 as its side surface facing towards the second roll replacing mechanism 22, and the first winding surface 2143 is connected to an end of the first pressing surface 2142 at an output end of the roll replacing passage c. In this way, when the first strip a is the spare strip, the first unwinding mechanism 11 unwinds and outputs the first strip a. The first strip a passes from an input end of the roll replacing passage c to the output end of the roll replacing passage c along the first pressing surface 2142, and winds around the first pushing block 214 along the first winding surface 2143.

An end of the first pressing surface 2142 at the input end of the roll replacing passage c is provided with a first guide roller 215, and/or an end of the first pressing surface 2142 at the output end of the roll replacing passage c is provided with a second guide roller 216a. In this way, the first guide roller 215 and/or the second guide roller 216a are used to guide the first strip a, avoiding the first pushing block 214 from directly contacting the first strip a and scratching the first strip a. It should be understood that both the first guide roller 215 and the second guide roller 216a are rotatable around their own axis relative to the first pushing block 214.

Further, a third guide roller 217 is provided at an end of the first winding surface 2143 away from the first pressing surface 2142. The third guide roller 217 is used to guide the first strip a winding around the first winding surface 2143, so as to avoid the first pushing block 214 from scratching the first strip a.

It should be noted that the first pressing mechanism 211 is not necessary. In some other embodiments, the first strip a can also be fixed to the first pushing block 214 by means of vacuum suction. Specifically, the first pushing block 214 has the first winding surface 2143 for the first strip a passing through the roll replacing passage c to wind around. The first winding surface 2143 is configured to suction a first strip a winding around the first winding surface 2143.

Further, the first winding surface 2143 is provided with a plurality of suction holes connected to an external vacuum source, so that the plurality of suction holes are used to suction the first strip a winding around the first winding surface 2143. When the first strip a needs to be released, a connection between each suction hole and the external vacuum source can be cut off.

Of course, it can be understood that, in order to improve the strip connection effect, a cutting mechanism can be set to cut off the starting end of the first strip a that is adsorbed and fixed to the first winding surface 2143 of the first pushing block 214, so as to ensure that each time strips are replaced, a length of the starting end of the first strip a as the spare strip has a good consistency. It can be understood that the cutting mechanism is mounted on the mounting plate 80 and is arranged corresponding to the first winding surface 2143. As for a specific structure of the cutting mechanism, a cylinder-driven cutter can be used, or other cutting structures in the prior art can be used, as long as the first strip a can be cut off, which is not limited here.

Please refer to FIG. 1 and FIG. 2, in an embodiment of the present application, the first roll replacing mechanism 21 further includes a first clamping mechanism 216. The first clamping mechanism 216 includes a first clamping driving member 2161 and a first clamping block 2162 which is connected to the first clamping driving member 2161 in a driving manner. The first clamping driving member 2161 is used to drive the first clamping block 2162 to clamp the first strip a pressed between the first roll replacing mechanism 21 and the second roll replacing mechanism 22. The cutting member 40 is used to cut off the first strip a from a position between the input end of the roll replacing c and the first clamping block 2162. In this way, it is ensured that two sides of the position where the first strip a is cut off by the cutting member 40 are clamped and fixed by the first clamping mechanism 216 and the first roll replacing mechanism 21 and the second roll replacing mechanism 22 respectively, which is conducive to improving the quality of the cross-section and ensuring the cutting effect. Alternatively, the first clamping driving member 2161 may be a clamping cylinder.

Specifically, in the embodiment, the first clamping driving member 2161 is mounted on the first fixing base 212 and is at a side of the first pushing block 214 away from the first pressing head 2114. In this way, when the strips are replaced, the cutting member 40 can cut at a position between a part of the first strip a that is pressed by the first pushing block 214 on the second roll replacing mechanism 22 and a part of the first strip a that is clamped by the first clamping block 2162, so that the first strip a is disconnected with the first unwinding mechanism 11 and adhered to the second strip b unwound by the second unwinding mechanism 12, so as to realize roll replacing.

It should be noted that the first clamping mechanism 216 is not necessary. The first clamping mechanism 216 may not be provided under a circumstance that the cutting effect of cutting the first strip a by the cutting member 40 can be guaranteed.

It should also be noted that the input end of the roll replacing passage c refers to an end for the first strip a and the second strip b to enter, and the output end of the roll replacing passage c refers to an end for the first strip a and the second strip b to exit. Specifically, in the embodiment as shown in FIG. 1, a lower end of the roll replacing passage c is the input end, and an upper end of the roll replacing passage c is the output end. Specifically, in an embodiment as shown in FIG. 5, a left end of the roll replacing passage c is the input end, and a right end of the roll replacing passage c is the output end.

Figure 3:
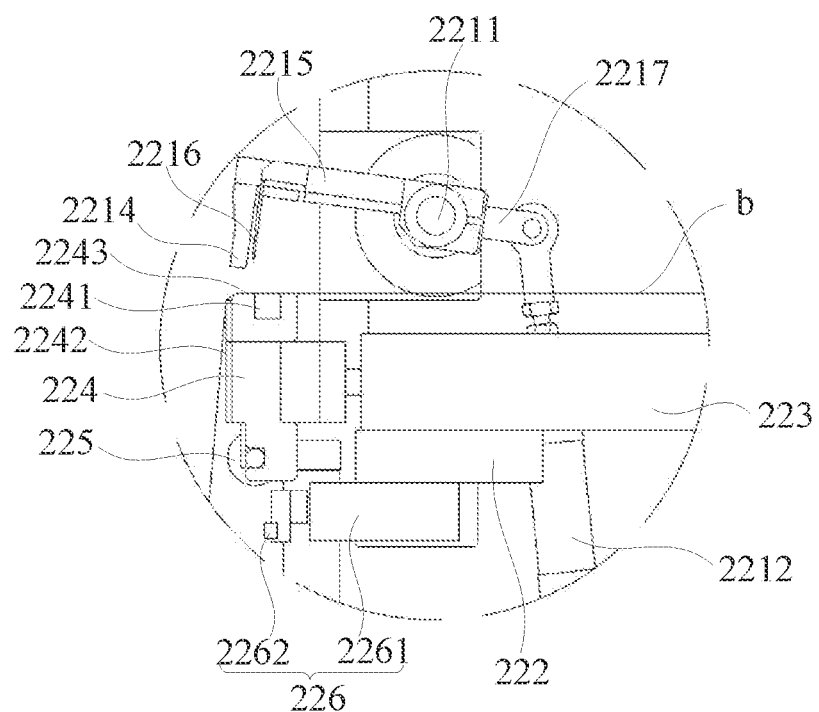
FIG. 3 is a partially enlarged view of position B of the roll replacing device as shown in FIG. 1.

Please refer to FIG. 1 and FIG. 3, in an embodiment of the present application, the second roll replacing mechanism 22 includes a second fixing base 222, a second driving member 223, and a second pushing block 224. The second fixing base 222 is fixedly connected to the mounting plate 80. The second driving member 223 is mounted on the second fixing base 222 and is connected to the second pushing block 224 in a driving manner, so as to drive the second pushing block 224 to move towards the first pushing block 214 of the first roll replacing mechanism 21, so that the first strip a and the second strip b passing through the roll replacing passage c are pressed on the first pushing block 214 of the first roll replacing mechanism 21, and then the first strip a and the second strip b are adhered to each other. It should be noted that when the second strip b is the spare strip, the second strip b passes through the roll replacing passage c and then winds around the second pushing block 224. When the second strip b is the work strip, the second strip b passes through the roll replacing passage c and continues to be transported downstream. Alternatively, the second driving member 223 may be a cylinder.

Please refer to FIG. 5 and FIG. 6, further, a second sliding rail can be arranged on the mounting plate 80, and a second sliding block is arranged on the second pushing block 224. The second sliding block slides on and fits with the second sliding rail, so as to guide a movement of the second pushing block 224 close to or away from the first roll replacing mechanism 21. Alternatively, the first sliding rail and the second sliding rail may be a same sliding rail, that is, the first sliding block and the second sliding block share the same sliding rail.

Of course, the second sliding rail and the second sliding block are not necessary. That is, in some embodiments (e.g., the embodiment as shown in FIG. 1), the second sliding rail and the second sliding block may not be set, and the second pushing block 224 may be directly mounted on a driving end of the second driving member 223.

Please refer to FIG. 1 and FIG. 3, in an embodiment of the present application, the roll replacing member further includes a second pressing mechanism 221. The second pressing mechanism 221 includes a second pressing head 2214. The second pressing head 2214 is configured to press and fix the second strip b to the second pushing block 224 in a controlled manner. In this way, after the first strip a is switched to the work strip, a new material roll is replaced on the second unwinding mechanism 22. A starting end of the second strip b (at this time, the second strip b is the spare strip) that is unwound by the second roll replacing mechanism 22 can be manually passed through the roll replacing passage c and wound around the second pushing block 224. Then, the second pressing head 2214 presses and fixes the second strip b to the second pushing block 224 to prepare for the next roll replacing.

In some embodiments, the second pressing mechanism 221 further includes a second rotating shaft 2211, a second swing driving member 2212, and a second pressing head base.

The second rotating shaft 2211 is rotatably arranged around its own axis and is connected to the second swing driving member 2212 in a driving manner. The second swing driving member 2212 is used to drive the second rotating shaft 2211 to rotate around its own axis. One end of the second pressing head base is connected to the second rotating shaft 2211, and another end of the second pressing head base is mounted with the second pressing head 2214.

Wherein, in a process that the second rotating shaft 2211 drives the second pressing head base to rotate, the second pressing head 2214 can press the second strip b passing through the roll replacing passage c on the second pushing block 224, so that the second strip b is fixed relative to the second pushing block 224.

Specifically, in the embodiment, the second pressing mechanism 221 further includes a second cutter base 2215, a second cutter 2216, and a second elastic member 2218. One end of the second cutter base 2215 is connected to the second rotating shaft 2211, and another end of the second cutter base 2215 is mounted with the second cutter 2216, so that the second cutter 2216 can rotate with the second rotating shaft 2211. An end of the second pressing head base away from the second pressing head 2214 is rotatably connected to the second rotating shaft 2211. The second elastic member 2218 is connected to the second rotating shaft 2211 and the second pressing head base. The second elastic member 2218 is used to provide a pretension force that makes the second pressing head base tend to drive the second pressing head 2214 to rotate towards the second pushing block 224, so that the second pressing head 2214 can drive the second pressing head base to overcome the pretension force provided by the second elastic member 2218 and rotate relative the second rotating shaft 2211 under an action of external force.

In a process that the second rotating shaft 2211 drives the second pressing head base and the second cutter base 2215 to rotate, the second pressing head 2214 can press the second strip b (i.e., the spare strip) passing through the roll replacing passage c on the second pushing block 224 of the second roll replacing mechanism 22, and the second cutter 2216 can cut off the second strip b pressed by the second pressing head 2214 on the second pushing block 224 of the second roll replacing mechanism 22, so as to ensure that a length of the starting end of the second strip b is consistent during each roll replacing, which is conducive to improving the strip connection effect. Specifically, the second rotating shaft 2211 is rotatably mounted on the mounting plate 80 around its own axis.

In this way, after pulling the second strip b to pass through the roll replacing passage c and to wind around the second pushing block 224, the second swing driving member 2212 drives the second rotating shaft 2211 to rotate, thereby driving the second pressing head 2214 to rotate and approach the second pushing block 224 of the second roll replacing mechanism 22, so as to press the second strip b winding around the second pushing block 224 of the second roll replacing mechanism 22 on the second pushing block 224. At a same time, the second cutter 2216 rotates with the second rotating shaft 2211 and moves close to the second pushing block 224 of the second roll replacing mechanism 22 until the second strip b pressed by the second pressing head 2214 on the second pushing block 224 is cut off, so as to facilitate the subsequent connection between the first strip a and the second strip b, which is conducive to improving the strip connection effect.

When the second strip b winding around the second pushing block 224 of the second roll replacing mechanism 22 needs to be pressed and cut off, firstly, the second swing driving member 2212 drives the second rotating shaft 2211 to rotate, so as to drive the second pressing head 2214 to rotate and approach the second pushing block 224 of the second roll replacing mechanism 22 through the second pressing head base, and at a same time to drive the second cutter 2216 to rotate and approach the second pushing block 224 of the second roll replacing mechanism 22 through the second cutter base 2215. When the second pressing head 2214 rotates to contact the second strip b on the second pushing block 224 of the second roll replacing mechanism 22 and presses the second strip b on the second pushing block 224 of the second roll replacing mechanism 22, the second rotating shaft 2211 continues rotating to continue driving the second cutter 2216 to rotate and approach the second pushing block 224 of the second roll replacing mechanism 22 through the second cutter base 2215, until the second cutter 2216 cuts off the second strip b. That is to say, in the process that the second rotating shaft 2211 drives the second pressing head 2214 and the second cutter 2216 to rotate respectively through the second pressing head base and the second cutter base 2215 and approach the second pushing block 224 of the second roll replacing mechanism 22, the second pressing head 2214 firstly presses the second strip b on the second pushing block 224 of the second roll replacing mechanism 22, and then the second cutter 2216 contacts the second strip b and cuts off the second strip b, which is conducive to improving the quality of the cross-section and the cutting effect.

It should be noted that through rotation of the second rotating shaft 2211, swing of the second pressing head 2214 and the second cutter 2216 around the second rotating shaft 2211 is realized, further realizing the pressing and cutting of the second strip b. Comparing with the rectilinear motion, space occupied by the second pressing mechanism 221 is reduced, and the structural of the roll replacing device is condensed.

Specifically, in the embodiment, a side of the second pushing block 224 facing towards the second cutter 2216 has a second cutting groove 2241, and the second cutting groove 2241 is defined corresponding to the second cutter 2216. In this way, the second cutter 2216 rotates with the second rotating shaft 2211 and approaches the second pushing block 224 until cutting into the second cutting groove 2241, so as to cut off the second strip b pressed by the second pressing head 2214 on the second pushing block 224, and avoiding damage caused by a contact between the second cutter 2216 and the second pushing block 224.

Alternatively, the second elastic member may be a torsion spring. The second elastic member is sleeved on the second rotating shaft 2211. One torque arm of the second elastic member is connected to the second pressing head base, and another torque arm of the second elastic member is fixed relative to the second rotating shaft 2211. Further, a second fixing ring is fixed and sleeved on the second rotating shaft 2211, and the torque arm of the second elastic member fixedly arranged relative to the second rotating shaft 2211 is connected to the second fixing ring. A second limit plate is fixedly mounted on the second rotating shaft 2211, and the second pressing head base abuts against the second limit plate under an action of the second elastic member, so as to limit the second pressing head base.

Specifically, in the embodiment, the second swing driving member 2212 includes a second driving body and a second telescopic end that is retractable relative to the second driving body. The second driving body is hinged to the mounting plate 80. The second pressing mechanism 221 further includes a second hinge 2217. One end of the second hinge 2217 is fixedly connected to the second rotating shaft 2211, and another end of the second hinge 2217 is hinged with the second telescopic end. In this way, the second telescopic end of the second swing driving member 2212 can be telescoped relative to the second driving body, so that the second rotating shaft 2211 can be driven to rotate through the second hinge 2217, thereby enabling the second pressing head 2214 and the second cutter 2216 to swing around the second rotating shaft 2211, and realizing pressing and cutting of the second strip b. Alternatively, the second swing driving member 2212 may be a cylinder.

It should be noted that a method for enabling the second pressing head 2214 and the second cutter 2216 to swing around the second rotating shaft 2211 is implemented through telescoping of the second telescopic end. Through setting a distance between the second pressing head 2214 and the second cutter 2216 and the second rotating shaft 2211 and a distance between the second telescopic end and the second rotating shaft 2211, the second pressing head 2214 and the second cutter 2116 are driven by a relatively small retracting stroke of the second telescopic end to press and cut off the second strip b respectively, which further reduces the space required by the second pressing mechanism 221 and improves the structural compactness of the roll replacing device.

Figure 9:
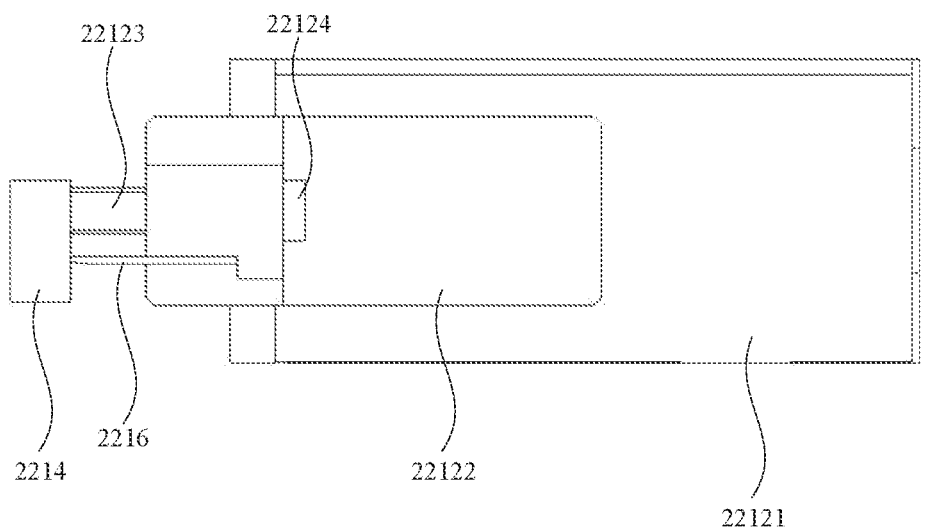
FIG. 9 is a schematic structural diagram of a second pressing mechanism of the roll replacing device as shown in FIG. 5.
Figure 10:
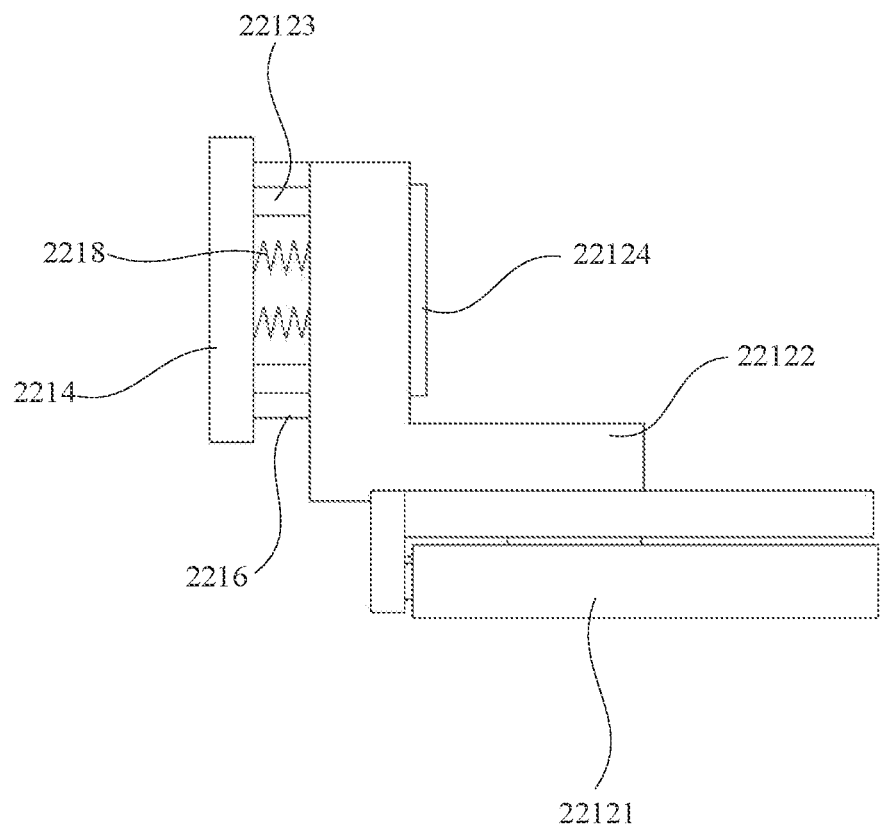
FIG. 10 is a schematic structural diagram of the second pressing mechanism as shown in FIG. 9 from another perspective.

It should be noted that the second pressing mechanism 221 is not limited to that the second pressing head and the second cutter press and cut off the second strip b in a swinging manner. Please refer to FIGS. 5, 9, and a 10, in other embodiments, the second pressing head 2214 and the second cutter 2216 of the second pressing mechanism 221 can also realize the pressing and cutting of the second strip b in the rectilinear movement manner. In this embodiment, the second pressing mechanism 221 further includes a second moving driving member 22121 and a second mounting base 22122. The second pressing head 2214 is mounted on the second mounting base 22122, and the second mounting base 22122 is mounted on a driving end of the second moving driving member 22121 to be driven by the second moving driving member 22121 to move along the first direction, and drive the second pressing head 2214 to move close to or away from the second pushing block 224, so as to press or release the second strip b winding around the second pushing block 224.

Specifically, in the embodiment, the second pressing mechanism 221 further includes the second cutter 2216 and the second elastic member 2218. The second cutter 2216 is arranged on the second mounting base 22122, so that the second cutter 2216 along with the second mounting base 22122 moves close to or away from the second pushing block 224 along the first direction. The second pressing head 2214 is movably connected to the second mounting base 22122 along the first direction, and the second elastic member 2218 abuts against the second pressing head 2214 and the second mounting base 22122 to provide a pretension force that makes the second pressing head 2214 tend to move towards the second pushing block 224 along the first direction. Alternatively, the second moving driving member 22121 may be a cylinder. The second elastic member 2218 may be a torsion spring.

In this way, after pulling the second strip b (at this time, the second strip b is the spare strip) to pass through the roll replacing passage c and to wind around the second pushing block 224, the second moving driving member 22121 drives the second mounting base 22122 to move along the first direction towards the second pushing block 224, thereby driving the second pressing head 2214 to move close to the second pushing block 224, so as to press the second strip b winding around the second pushing block 224 on the second pushing block 224. At the same time, the second cutter 2216 follows the second mounting base 22122 and moves close to the second pushing block 224 along the first direction, until the second strip b pressed by the second pressing head 2214 on the second pushing block 224 is cut off, so as to facilitate the subsequent connection between the first strip a and the second strip b.

It should be noted that the second moving driving member 22121 is used to drive the second pressing head 2214 and the second cutter 2216 to move along the first direction to realize the pressing and cutting of the second strip b, which simplifies a structure of the second pressing mechanism 221, and makes pressing and cutting actions more stable and reliable.

Further, the second pressing mechanism 221 further includes a second guide rod 22123 and a second limit block 22124. The second mounting base 22122 is defined with a second guide hole. The second guide rod 22123 is arranged to pass through the second guide hole, and slides in and fits with the second guide hole. The second limit block 22114 is fixedly connected to one end of the second guide rod 22123 for avoiding the second guide rod 22123 from falling off from the second mounting base 22122. Another end of the second guide rod 22123 is fixedly connected to the second pressing head 2214. The second elastic member 2218 abuts between the second mounting base 22122 and the second pressing head 2214. In this way, the second guide rod 22123 is used to guide a movement of the second pressing head 2214, so as to make an action of the second pressing head 2214 pressing or releasing the second strip b more stable and reliable. It should be noted that the second mounting base 22122 may be defined with a plurality of parallel second guide holes, each of the second guide holes has one second guide rod 22123 to slide in and fit with, ends of all the second guide rods 22123 at one same side of the second mounting base 22122 are all fixedly connected to the second limit block 22124, and ends of all the second guide rods 22123 at another side of the second mounting base 22122 are all fixedly connected to the second pressing head 2214. In this way, the plurality of second guide rods 22123 guide a movement of the second pressing head 2214, so as to further improve stability and reliability of the pressing or releasing action by the second pressing head 2214 on the second strip b.

Please refer to FIG. 6, in an embodiment of the present application, the second pushing block 224 has a second winding surface 2243 for the second strip b passing through the roll replacing passage c to wind around, and the second winding surface 2243 is arranged corresponding to the second pressing head 2214, so that the second pressing head 2214 can press the second strip b on the second winding surface 2243. In this way, when the starting end of the second strip b needs to be pressed and cut off, the second pressing head 2214 and the second cutter 2216 are driven by the second swing driving member 2212 or the second moving driving member 22121 to swing or move towards the second winding surface 2243 of the second pushing block 224, which firstly makes the second pressing head 2214 contacts the second strip b and presses the second strip b on the second winding surface 2243, and then makes the second cutter 2216 contacts the second strip b pressed on the second winding surface 2243 and cut off the second strip b.

Specifically, in the embodiment, the second pushing block 224 also has a second pressing surface 2242 as its side surface facing towards the first roll replacing mechanism 21, and the second winding surface 2243 is connected to an end of the second pressing surface 2242 at the output end of the roll replacing passage c. In this way, when the second strip b is the spare strip, the second unwinding mechanism 12 unwinds and outputs the second strip b. The second strip b passes from the input end of the roll replacing passage c to the output end of the roll replacing passage c along the second pressing surface 2242, and winds around the second pushing block 224 along the second winding surface 2243.

An end of the second pressing surface 2242 at the input end of roll replacing passage c is provided with a fourth guide roller 225, and/or an end of the second pressing surface 2242 at the output end of roll replacing passage c is provided with a fifth guide roller 226b. In this way, the fourth guide roller 225 and/or the fifth guide roller 226b are used to guide the second strip b, avoiding the second pushing block 224 from directly contacting the second strip b and scratching the second strip b. It should be understood that, both the fourth guide roller 225 and the fifth guide roller 226b are rotatable around their own axis relative to the second pushing block 224.

Further, a sixth guide roller 227 is provided at an end of the second winding surface 2243 away from the second pressing surface 2242. The sixth guide roller 227 is used to guide the second strip b winding around the second winding surface 2243, so as to avoid the second pushing block 224 from scratching the second strip b.

It should be noted that the second pressing mechanism 221 is not necessary. In some other embodiments, the second strip b can also be fixed to the second pushing block 224 by means of the vacuum suction. Specifically, the second pushing block 224 has the second winding surface 2243 for the second strip b passing through the roll replacing passage c to wind around. The second winding surface 2243 is configured to suction a wound second strip b.

Further, the second winding surface 2243 is provided with a plurality of suction holes connected to an external vacuum source, so that the plurality of suction holes are used to suction the second strip b winding around the second winding surface 2243. When the second strip b needs to be released, a connection between each suction hole and the external vacuum source can be cut off.

Of course, it can be understood that, in order to improve the strip connection effect, a cutting mechanism can be set to cut off the starting end of the second strip b that is adsorbed and fixed to the second winding surface 2243 of the second pushing block 224, so as to ensure that each time the strips are replaced, a length of the starting end of the second strip b as the spare strip has a good consistency. It can be understood that the cutting mechanism is mounted on the mounting plate 80 and is arranged corresponding to the second winding surface 2243. As for a specific structure of the cutting mechanism, a cylinder-driven cutter can be used, or other cutting structures can be used, as long as the second strip b can be cut off, which is not limited here.

Please refer to FIG. 1 and FIG. 3, in an embodiment of the present application, the second roll replacing mechanism 22 further includes a second clamping mechanism 226. The second clamping mechanism 226 includes a second clamping driving member 2261 and a second clamping block 2262 which is connected to the second clamping driving member 2261 in a driving manner. The second clamping driving member 2261 is used to drive the second clamping block 2262 to clamp the second strip b pressed between the first roll replacing mechanism 21 and the second roll replacing mechanism 22. The cutting member 40 is used to cut off the second strip b from a position between the input end of the roll replacing c and the second clamping block 2262. In this way, it is ensured that one side of the position where the second strip b is cut off by the cutting member 40 is clamped and fixed by the second clamping mechanism 226 and the first roll replacing mechanism 21, and the other side of the position where the second strip b is cut off by the cutting member 40 is clamped and fixed by the second clamping mechanism 226 and the second roll replacing mechanism 22, which is conducive to improving the quality of the cross-section and ensuring the cutting effect. Alternatively, the second clamping driving member 2261 may be a gripper cylinder.

Specifically, in the embodiment, the second clamping driving member 2261 is mounted on the second fixing base 222 and is at a side of the second pushing block 224 away from the second pressing head 2214. In this way, when the strips are replaced, the cutting member 40 can cut at a position between a part of the second strip b that is pressed by the second pushing block 224 on the second roll replacing mechanism 21 and a part of the second strip b that is clamped by the second clamping block 2262, so that the second strip b is disconnected with the second unwinding mechanism 12 and adhered to the first strip a unwound by the first unwinding mechanism 11, so as to realize roll replacing.

It should be noted that the second clamping mechanism 226 is not necessary. The second clamping mechanism 226 may not be provided under a circumstance that the cutting effect of cutting the second strip b by the cutting member 40 can be guaranteed.

Figure 11:
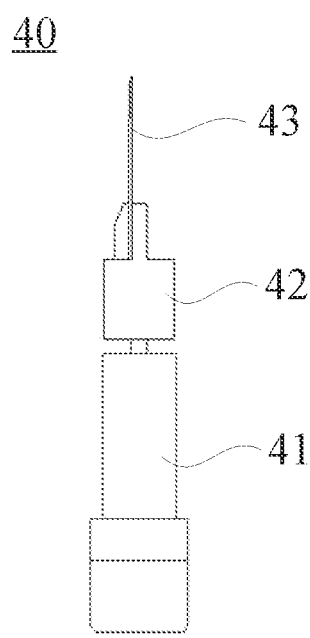
FIG. 11 is a schematic structural diagram of a cutting member of the roll replacing devices as shown in FIG. 1 and FIG. 5.

Please refer to FIGS. 1, 5, and 11, in an embodiment of the present application, the cutting member 40 includes a cutting driving member 41, a third cutter base 42, and a third cutter 43. The cutting driving member 41 is mounted on the mounting plate 80. The third cutter 43 is mounted on a driving end of the cutting driving member 41 through the third cutter base 42, and is arranged corresponding to the input end of the roll replacing passage c. The third cutter 43 is used to cut off the first strip a or the second strip b at the input end of the roll replacing passage c under a drive of the cutting driving member 41. In this way, when the third cutter 43 moves towards the input end of the roll replacing passage c under the drive of the cutting driving member 41, the third cutter 43 can cut off the first strip a or the second strip b pressed between the first pushing block 214 of the first roll replacing mechanism 21 and the second pushing block 224 of the second roll replacing mechanism 22.

Please continue referring to FIG. 1, in an embodiment of the present application, the roll replacing device further includes a first transition roller 50 mounted on the mounting plate 80. The first transition roller 50 is arranged between the first unwinding mechanism 11 and the first roll replacing mechanism 21, and is used to guide the first strip a unwound and output by the first unwinding mechanism 11 into the roll replacing passage c.

The roll replacing device further includes a second transition roller 60 mounted on the mounting plate 80. The second transition roller 60 is arranged between the second unwinding mechanism 12 and the second roll replacing mechanism 22, and is used to guide the second strip b unwound and output by the second unwinding mechanism 12 into the roll replacing passage c.

Further, the first clamping block 2162 is arranged corresponding to the first transition roller 50. When the first strip a needs to be clamped and fixed, the first clamping driving member 2161 drives the first clamping block 2162 to move towards the first transition roller 50, until the first clamping block 2162 cooperates with the first transition roller 50 to clamp and fix the first strip a winding around the first transition roller 50. Alternatively, the first clamping driving member 2161 may be a cylinder. It should be noted that in order to facilitate cooperating with the first clamping block 2162 to clamp and fix the first strip a, the first strip a winds from a side of the first transition roller 50 away from the second transition roller 60 and enters the roll replacing passage c.

Further, the second clamping block 2262 is arranged corresponding to the second transition roller 60. When the second strip needs to be clamped and fixed, the second clamping driving member 2261 drives the second clamping block 2262 to move towards the second transition roller 60, until the second clamping block 2262 cooperates with the second transition roller 60 to clamp and fix the second strip b winding around the second transition roller 60. Alternatively, the second clamping driving member 2261 may be a cylinder. It should be noted that in order to facilitate cooperating with the second clamping block 2262 to clamp and fix the second strip b, the second strip b winds from a side of the second transition roller 60 away from the first transition roller 50 and enters the roll replacing passage c.

In the embodiment of the present application, the roll replacing device further includes at least one third transition roller 70. The at least one third transition roller 70 is arranged downstream of the roll replacing passage c, so as to guide the first strip a or the second strip b (i.e., the work strip) passing through the roll replacing passage c downstream for outputting.

Specifically, in the embodiment, the roll replacing device further includes a pressing member 90 arranged downstream of the roll replacing passage c. The pressing member 90 is used to press the first strip a or the second strip b (i.e., the work strip) on any third transition roller 70. In this way, in order to avoid pulling the downstream first strip a or second strip b (i.e., the work strip) in the roll replacing process, the pressing member 90 can be used to press the first strip a or second strip b on the third transition roller 70 before replacing the strips.

Further, the pressing member 90 includes a pressing driving member and a pressing block. The pressing driving member is mounted on the mounting plate 80, and the pressing block is connected to a driving end of the pressing driving member, so that the pressing driving member drives the pressing block to press the first strip a or the second strip b on the third transition roller 70. Alternatively, the pressing driving member may be a pressing cylinder.

In the embodiment of the present application, the roll replacing device further includes a correction member, which includes a first correction roller 31 arranged downstream of the first roll replacing mechanism 21 and a second correction roller 32 arranged downstream of the second roll replacing mechanism 22. The first correction roller 31 is used to position the first strip a (at this time, the first strip a is the spare strip) winding around the first pushing block 214 to correct a deflection occurred in a process of pulling the first strip a. The second correction roller 32 is used to position the second strip b (at this time, the second strip b is the spare strip) winding around the second pushing block 224 to correct a deflection occurred in a process of pulling the second strip b.

Of course, further, the first strip a passing through the roll replacing passage c and winding around the first winding surface of the first pushing block 214 can also be wound and fixed on the first correction roller 31, so that the first correction roller 31 can not only correct the first strip a, but also fix the first strip a. Similarly, the second strip b passing through the roll replacing passage c and winding around the second winding surface of the second pushing block 224 can also be wound and fixed on the second correction roller 32. In this way, when the first strip a is the work strip and the second strip b is the spare strip, the first strip a passes through the roll replacing passage c and is transported downstream, and the second strip b passes through the roll replacing passage c, winds around the second winding surface of the second pushing block 224, and is wound and fixed on the second correction roller 32, so that the second strip b is cut off by the second cutter 2216 during the roll replacing. This ensures consistency of a size of the starting end of the second strip b during each roll replacing, which is conducive to improving the strip connection effect. When the first strip a is the spare strip and the second strip b is the work strip, the first strip a passes through the roll replacing passage c, winds around the first winding surface of the first pushing block 214, and is wound and fixed on the first correction roller 31, and the second strip b passes through the roll replacing passage c and is transported downstream, so that the first strip a is cut off by the first cutter 2116 during the roll replacing. This ensures consistency of a size of the starting end of the first strip a during each roll replacing, which is conducive to improving the strip connection effect. In this embodiment, since the first correction roller 31 can fix the first strip a when the first strip a is the spare strip, it may be unnecessary to use the first pressing head 2114 for pressing and fixing. Since the second correction roller 32 can fix the second strip b when the second strip b is the spare strip, it may be unnecessary to use the second pressing head 2214 for pressing and fixing. Specifically, the first correction roller 31 and the second correction roller 32 can be mounted on the mounting plate 80.

Further, both the first correction roller 31 and the second correction roller 32 can rotate around their own axis in a controlled manner. In this way, when the first strip a is the spare strip, after being manually pulled to pass through the roll replacing passage c, the first strip a winds around the first winding surface of the first pushing block 214 and is wound and fixed on the first correction roller 31. Thus, when the first strip a is cut off by the first cutter during the roll replacing, the first correction roller rotates around its own axis, so that an end of the first strip a connected to the first correction roller 31 is rolled up by the first correction roller 31. When the second strip b is the spare strip, after being manually pulled to pass through the roll replacing passage c, the second strip b winds around the second winding surface of the second pushing block 224 and is wound on the second correction roller 32. Thus, when the second strip b is cut off by the second cutter during the roll replacing, an end of the second strip b connected to the second correction roller 32 is rolled up by the second correction roller 32.

It should be noted that a rotation of the first correction roller 31 around its own axis can be driven by a rolling-up driving mechanism in the prior art, and thus it will not be elaborated here. A rotation of the second correction roller 32 around its own axis can be driven by the rolling-up driving mechanism in the prior art, and thus it will not be elaborated here.

Please continue referring to FIG. 1, in an embodiment of the present application, the unwinding member further includes a first buffer mechanism 13. The first buffer mechanism 13 is mounted on the mounting plate 80 and arranged between the first unwinding mechanism 11 and the first roll replacing mechanism 21 to buffer the first strip a unwound and output by the first unwinding mechanism 11.

The unwinding member further includes a second buffer mechanism 14. The second buffer mechanism 14 is mounted on the mounting plate 80 and arranged between the second roll replacing mechanism 12 and the second roll replacing mechanism 22 to buffer the second strip b unwound and output by the second unwinding mechanism 12.

Please refer to FIG. 5, of course, in some embodiments, in order to simplify the structure and reduce the required space, the above-mentioned first buffer mechanism 13 and second buffer mechanism 14 may not be set, and a third buffer mechanism 15 is set downstream of the roll replacing member. The third buffer mechanism 15 is used to buffer the first strip a or the second strip b (i.e., the work strip) that passes through the roll replacing passage c and is transported downstream.

Please refer to FIG. 1 and FIG. 5, the following describes the roll replacing process of the roll replacing device, by taking a condition that the first strip a is the work strip and the second strip b is the spare strip as an initial state (i.e., the first strip a passes through the roll replacing passage c and is transported downstream, and the second strip b passes through the roll replacing passage c and winds around the second pushing block 224):

Firstly, the second swing driving member 2212 drives the second rotating shaft 2211 to rotate or the second moving driving member 22121 drives the second mounting base 22122 to move in the first direction, so that the second pressing head 2214 presses the second strip b passing through the roll replacing passage c on the second winding surface 2243 of the second pushing block 224, and the second cutter 2216 cuts off the second strip b pressed on the second winding surface 2243 of the second pushing block 224. Further, an end of the second strip b connected to the second unwinding mechanism 12 continues to be pressed by the second pressing head 2214 on the second winding surface 2243 of the second pushing block 224.

Then, the first driving member 213 drives the first pushing block 214 to move towards the second pushing block 224, so as to press the first strip a and the second strip b in the roll replacing passage c between the first pushing block 214 and the second pushing block 224, so that the first strip a and the second strip b are adhered.

Then, the first clamping driving member 2161 drives the first clamping block 2162 to clamp the first strip a, and the cutting driving member 41 drives the third cutter 43 to cut off the first strip a at the input end of the roll replacing passage c.

Finally, the first driving member 213 drives the first pushing block 214 to move away from the second pushing block 224 and resets. The second swing driving member 2212 drives the second rotating shaft 2211 to rotate in reverse, or the second moving driving member 22121 drives the second mounting base 22122 to move in reverse, so as to drive the second cutter 2216 and the second pressing head 2214 to move away from the second pushing block 224 and resets, so that the second strip b passes through the roll replacing passage c and is transported downstream (that is, at this time, the second strip b is the work strip).

It should be noted that after the roll replacing is completed, a material roll on the first unwinding mechanism 11 can be replaced, and the starting end of the first strip a unwound and output by the first unwinding mechanism 11 can be pulled to pass through the roll replacing passage c and wind around the first winding surface of the first pushing block 214, and finally the first correction roller 31 is used for positioning. Then, the first pressing head 2114 is used to press the first strip a passing through the roll replacing passage c on the first winding surface 2143 of the first pushing block 214. The first cutter 2116 is used to cut off the first strip a pressed on the first winding surface 2143 of the first pushing block 214. Then, an end of the first strip a connected to the first unwinding mechanism 11 continues to be pressed by the first pressing head 2114 on the first winding surface 2143 of the first pushing block 214 to prepare for the next roll replacing. When a material roll on the second unwinding mechanism 12 has been unwound, roll replacing steps to be performed again are similar to the above roll replacing steps, and thus will not be repeated here.

Figure 12:
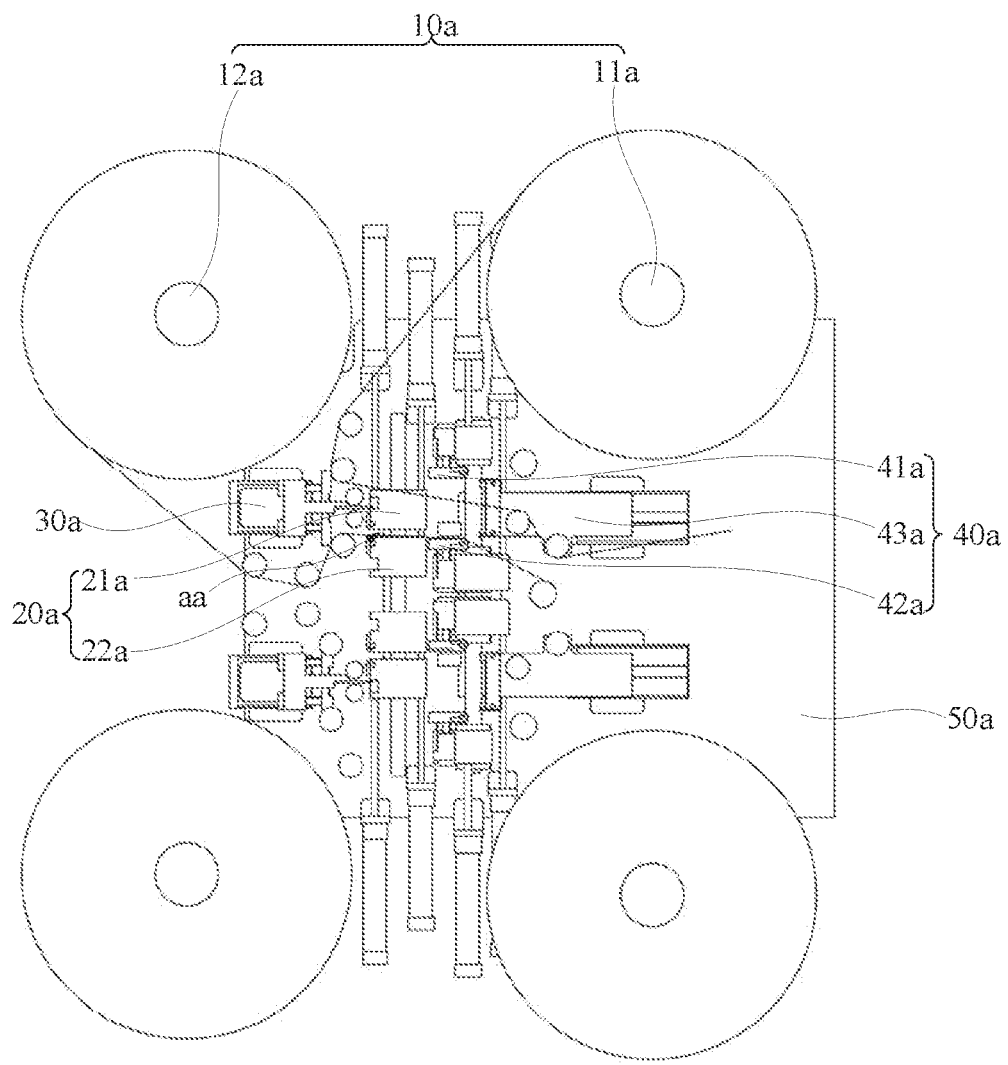
FIG. 12 is a schematic structural diagram of a roll replacing device in an embodiment of the present application.

Referring to FIG. 12, an embodiment of the present application provides a roll replacing device, including an unwinding member 10a, a roll replacing member 20a, a cutting member 30a, and an end pressing member 40a.

The unwinding member 10a is used to unwind and output the work strip and the spare strip downstream. That is, the unwinding member 10a unwinds and outputs two strips, both of which can be used as the work strip and the spare strip. One of the strips is used as the work strip, and another one of the strips is used as the spare strip.

The roll replacing member 20a is arranged downstream of the unwinding member 10a, and has a roll replacing passage aa for the work strip and the spare strip to pass through. The roll replacing member 20a is configured to be able to be controlled to press the work strip and the spare strip in the roll replacing passage aa, so that parts of the work strip and the spare strip in the roll replacing passage aa are adhered to each other. The cutting member 30a is arranged upstream of the roll replacing member 20a and is used to cut off the work strip pressed by the roll replacing member 20a from an input end of the roll replacing passage aa.

The end pressing member 40a is arranged downstream of the roll replacing member 20a and includes a first pressing mechanism 41a, a second pressing mechanism 42a, and a support mechanism 43a. Between the first pressing mechanism 41a and the second pressing mechanism 42a, a pressing passage ba (see FIG. 13) is formed for the work strip and the spare strip to pass through. The support mechanism 43a can be controlled to extend into or exit the pressing passage ba.

When the support mechanism 43a extends into the pressing passage ba, the first pressing mechanism 41a or the second pressing mechanism 42a can be controlled to press the spare strip on the support mechanism 43a and cut off the spare strip pressed on the support mechanism 43a. When the support mechanism 43a exits the pressing passage ba, the first pressing mechanism 41a or the second pressing mechanism 42a can be controlled to move, and press and fix a cutting end of the spare strip and the work strip in the pressing passage ba between the first pressing mechanism 41a and second pressing mechanism 42a, so that the cutting end of the spare strip is adhered with the work strip.

In the above roll replacing device, the work strip passes through the roll replacing passage aa and the pressing passage ba in sequence, and is transported downstream. When preparing a strip, firstly, the spare strip is pulled to pass through the roll replacing passage aa, and pass through the pressing passage ba along the second pressing mechanism 42a. Then, the support mechanism 43a is controlled to extend into the pressing passage ba. Then, the second pressing mechanism 42a is controlled to press the spare strip on the support mechanism 43a, and the spare strip is cut off.

During roll replacing, first of all, the roll replacing member 20a presses the work strip and the spare strip in the roll replacing passage aa, so that parts of the work strip and the spare strip in the roll replacing passage aa are adhered to each other. The cutting member 30a cuts off the work strip at the input end of the roll replacing passage aa. Then, the second pressing mechanism 42a is controlled to separate from the support mechanism 43a to release the pressing towards the spare strip. Then, the support mechanism 43a is controlled to exit the pressing passage ba. At this time, a cut-off part of the spare strip can be taken away. The cutting end of the spare strip (that is, a starting end of the spare strip passing through the roll replacing passage aa) is located on the second pressing mechanism 42a. Then, the first pressing mechanism 41a is controlled to move towards the second pressing mechanism 42a to press the cutting end of the spare strip and the work strip on the second pressing mechanism 42a, so that the cutting end of the spare strip is adhered with the work strip. Finally, the first pressing mechanism 41a is controlled to move away from the second pressing mechanism 42a and resets, and the roll replacing member 20a is controlled to release the pressing towards the work strip and the spare strip. At this time, the spare strip can be transported downstream along with the work strip, that is, the spare strip output by the unwinding member 10a is converted into the work strip.

At this time, an exhausted material roll on the unwinding member 10a can be replaced with a new material roll, and a strip at a position for unwinding the new material roll can be used as the spare strip for strip preparation. That is, the spare strip is pulled to pass through the roll replacing passage aa and pass through the pressing passage ba along the first pressing mechanism 41a. Then, the support mechanism 43a is controlled to extend into the pressing passage ba. Then, the first pressing mechanism 41a presses the spare strip on the support mechanism 43a, and the spare strip is cut off to prepare for the next roll replacing. The next roll replacing process is similar to the above process, and thus will not be repeated here.

In this way, the roll replacing device of the present application can realize an automatic switch (i.e., automatic roll replacing) between the work strip and the spare strip, and can use the end pressing member 40a to press and adhere the cutting end of the spare strip and the work strip during the roll replacing process, so that the spare strip and the work strip are firmly adhered. This avoids falling of the spare strip and the work strip due to that the cutting end of the spare strip is easy to be adhered to a transition roller in a subsequent strip moving process.

It should be noted that the work strip refers to a strip that is output by the unwinding member 10a, passes through the roll replacing passage aa and the pressing passage ba in sequence, and is transported downstream. The spare strip refers to a strip that is output by the unwinding member 10a, passes through the roll replacing passage aa, then passes through the pressing passage ba along the first pressing mechanism 41a or the second pressing mechanism 42a, and is not transported downstream. It can be understood that after the automatic roll replacing, the spare strip is switched to the work strip and transported downstream, and the strip unwound from a replaced new material roll is used as the spare strip.

It should also be noted that the work strip and the spare strip can be adhesive tapes. Thus, in the roll replacing process, the work strip and the spare strip pressed by the roll replacing member 20a can be adhered to each other, and the work strip and the cutting end of the spare strip pressed by the first pressing mechanism 41a and the second pressing mechanism 42a can also be adhered to each other. Of course, in some other embodiments, they can also be other types of strips, and a connection between the work strip and the spare strip is realized by pasting a double-sided adhesive tape on the spare strip, which is not limited here.

Specifically, in the embodiment, the roll replacing device includes a first state and a second state. In the first state of the roll replacing device, when the support mechanism 43a extends into the pressing passage ba, the first pressing mechanism 41a is controlled to press the spare strip on the support mechanism 43a and cut off the spare strip pressed on the support mechanism 43a. When the support mechanism 43a exits the pressing passage ba, the second pressing mechanism 42a is controlled to move close to the first pressing mechanism 41a, and press the cutting end of the spare strip and the work strip in the pressing passage ba on the first pressing mechanism 41a.

In the second state of the roll replacing device, when the support mechanism 43a extends into the pressing passage ba, the second pressing mechanism 42a is controlled to press the spare strip on the support mechanism 43a and cut off the spare strip pressed on the support mechanism 43a. When the support mechanism 43a exits the pressing passage ba, the first pressing mechanism 41a is controlled to move close to the second pressing mechanism 42a, and presses the cutting end of the spare strip and the work strip in the pressing passage ba on the second pressing mechanism 42a.

In this way, when the spare strip passes through the pressing passage ba along the first pressing mechanism 41a, and the work strip passes through the pressing passage ba between the spare strip and the second pressing mechanism 42a, the roll replacing device performs a roll replacing operation in the first state. When the spare strip passes through the pressing passage ba along the second pressing mechanism 42a, and the work strip passes through the pressing passage ba between the spare strip and the first pressing mechanism 41a, the roll replacing device performs the roll replacing operation in the second state.

Specifically, in the embodiment, the roll replacing device further includes a mounting base plate 50a. The unwinding member 10a, the roll replacing member 20a, the cutting member 30a, and the end pressing member 40a are mounted on the mounting base plate 50a, which is conducive to improving the integration of various mechanisms of the roll replacing device, reducing the volume, and saving the space that needs to be occupied.

In the embodiment of the present application, the unwinding member 10a includes a first unwinding mechanism 11a and a second unwinding mechanism 12a, which are arranged on the mounting base plate 50a. The first unwinding mechanism 11a is used to unwind and output a strip that can be used as both the work strip and the spare strip to the roll replacing member 20a. The second unwinding mechanism 12a is used to unwind and output a strip that can be used as the work strip and the spare strip to the roll replacing member 20a. That is to say, when the strip unwound and output by the first unwinding mechanism 11a is used as the work strip, the strip unwound and output by the second unwinding mechanism 12a is used as the spare strip. When the strip unwound and output by the first unwinding mechanism 11a is used as the spare strip, the strip unwound and output by the second unwinding mechanism 12a is used as the work strip.

It should be noted that specific structures of the first unwinding mechanism 11a and the second unwinding mechanism 12a can adopt an unwinding structure in the prior art, as long as it can realize continuous unwinding and outputting the strip, which is not limited here.

Figure 13:
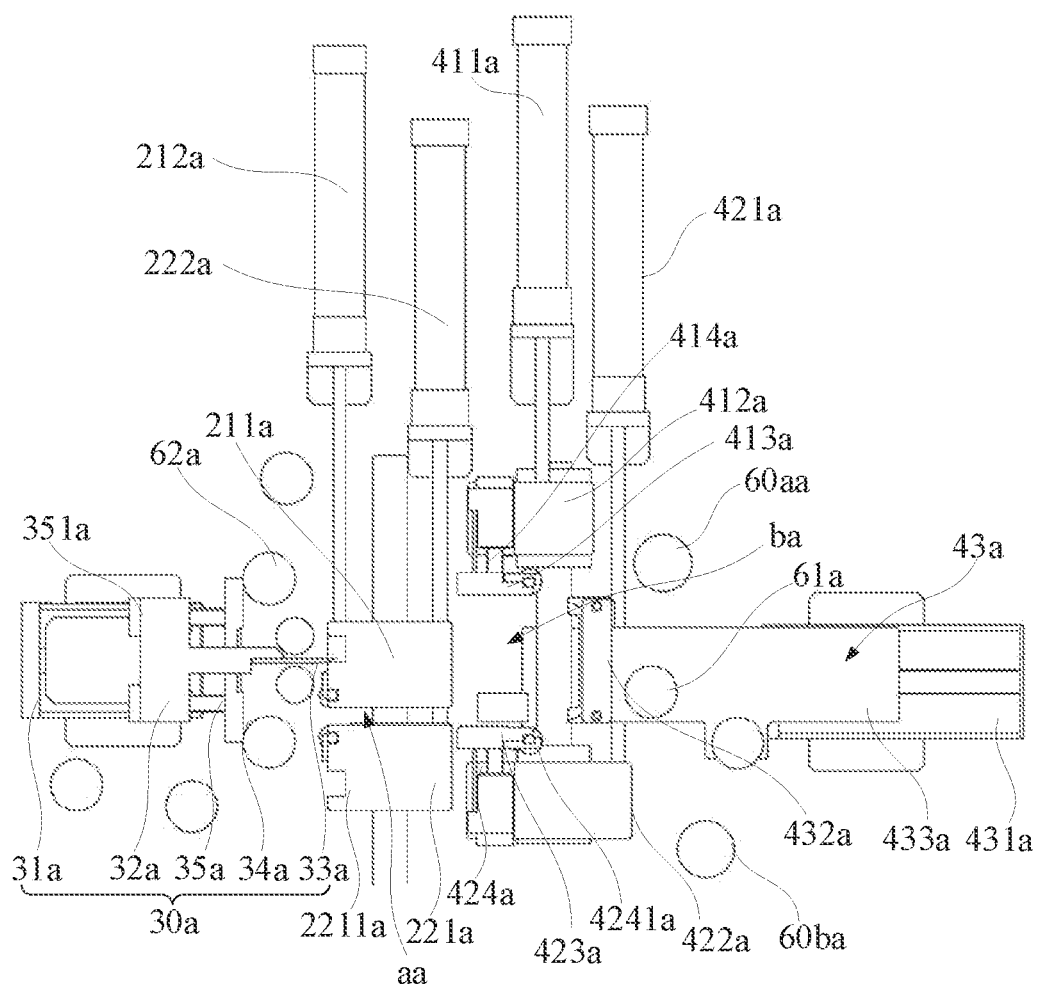
FIG. 13 is a schematic structural diagram of the roll replacing device as shown in FIG. 12 (an unwinding member is omitted).
Figure 14:
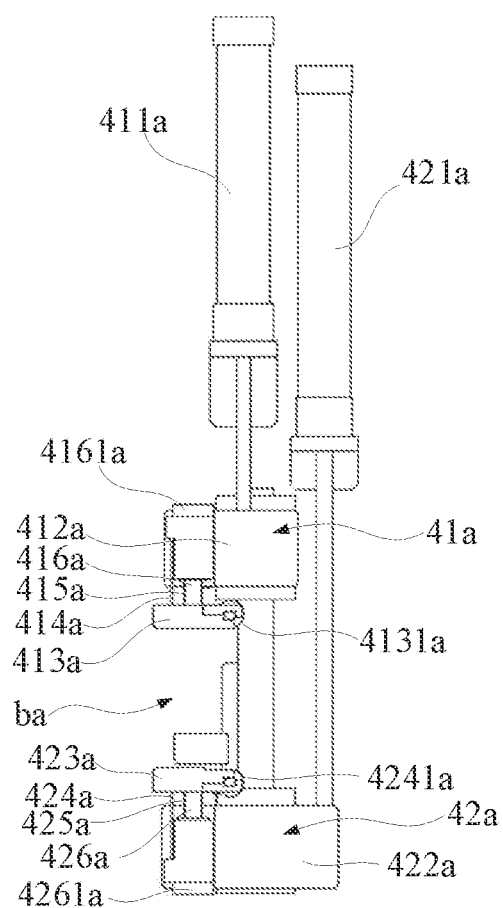
FIG. 14 is a schematic structural diagram of a first pressing mechanism and a second pressing mechanism of an end pressing member of the roll replacing device as shown in FIG. 12.
Figure 15:
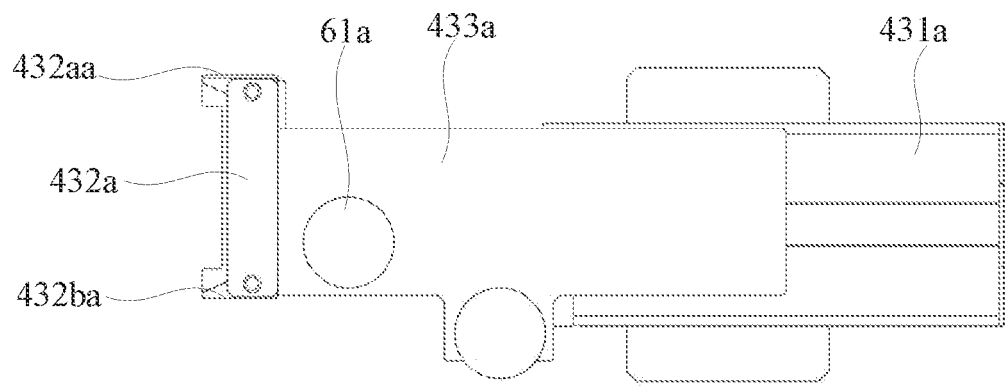
FIG. 15 is a schematic structural diagram of a support mechanism of the end pressing member of the roll replacing device as shown in FIG. 12.

Please refer to FIGS. 13 and 14, in an embodiment of the present application, the first pressing mechanism 41a includes a first driving member 411a, a first moving base 412a, a first pressing block 413a, and a first cutter 414a. The first driving member 411a is connected to the first moving base 412a in a driving manner to drive the first moving base 412a to move close to or away from the second pressing mechanism 42a. The first pressing block 413a and the first cutter 414a are arranged on the first moving base 412a to move with the first moving base 412a.

When the first moving base 412a moves close to the second pressing mechanism 42a, the first moving base 412a drives the first pressing block 413a to press the spare strip on the support mechanism 43a, and drives the first cutter 414a to cut off the spare strip. Or, when the first moving base 412a moves close to the second pressing mechanism 42a, the first moving base 412a drives the first pressing block 413a to press the work strip and the cutting end of the spare strip on the second pressing mechanism 42a.

Alternatively, the first driving member 411a may adopt a cylinder. When the support mechanism 43a extends into the pressing passage ba, a distance between the first pressing block 413a and the support mechanism 43a is relatively small, usually several millimeters, and is much smaller than a distance between the first pressing block 413a and the second pressing mechanism 42a. In this way, when the cylinder drives the first pressing block 413a to move towards the second pressing mechanism 42a, the support mechanism 43a blocks the first pressing block 413a when extending into the pressing passage ba, the first pressing block 413a abuts against the support mechanism 43a, so that the spare strip is pressed on the support mechanism 43a and cut off by the first cutter 414a. The support mechanism 43a cannot block the first pressing block 413a when not extending into the pressing passage ba, the first pressing block 413a moves to abut against the second pressing mechanism 42a, and the spare strip and the work strip are pressed on the second pressing mechanism 42a.

Specifically, in the embodiment, the pressing mechanism 41a further includes a first elastic member 415a, and the first pressing block 413a is movably connected to the first moving base 412a. Two opposite ends of the first elastic member 415a abut against the first pressing block 413a and the first moving base 412a respectively, which is used to provide a pretension force that makes the first pressing block 413a move towards the second pressing mechanism 42a relative to the first moving base 412a. The first pressing block 413a has a first anti-collision groove (not shown in figures) for the first cutter 414a to pass through. In this way, during a strip preparation process, the spare strip is pulled to pass through the pressing passage ba along the first pressing block 413a, and the support mechanism 43a is controlled to extend into the pressing passage ba. Then, the first driving member 411a is used to drive the first moving base 412a to move towards the second pressing mechanism 42a. First, the first pressing block 413a presses the spare strip on the support mechanism 43a (pressing the first elastic member 415a). As the first moving base 412a continues moving towards the second pressing mechanism 42a (continuing pressing the first elastic member 415a), the first cutter 414a passes through the first anti-collision groove of the first pressing block 413a, and cuts off the spare strip pressed by the first pressing block 413a on the support mechanism 43a. When it is necessary to release the pressing towards the spare strip, the first driving member 411a is used to drive the first moving base 412a to move away from the second pressing mechanism 42a. First, the first cutter 414a moves with the first moving base 412a and exits the first anti-collision groove. As the first moving base 412a continues moving away from the second pressing mechanism 42a, the first pressing block 413a is driven to separate from the support mechanism 43a until it returns to an initial position.

Specifically, in the embodiment, the first pressing mechanism 41a further includes a first guide rod 416a. The first guide rod 416a is connected to the first moving base 412a in a sliding manner, and an end of the first guide rod 416a facing towards the second pressing mechanism 42a is fixedly connected to the first pressing block 413a. Thus, a movement of the first pressing block 413a is guided by a sliding of the first guide rod 416a relative to the first moving base 412a, making the first pressing block 413a pressing the strip more stable and reliable. Further, the first moving base 412a has a first guide hole (not shown in figures). The first guide rod 416*a* slides in and fits with the first guide hole, and an end of the first guide rod 416*a* away from the second pressing mechanism 42*a* is connected to a first limit block 4161*a*. The first limit block 4161*a* is used to avoid the first guide rod 416*a* from falling off from the first guide hole. An end of the first guide rod 416*a* facing towards the second pressing mechanism 42*a* is fixedly connected to the first pressing block 413*a*, so that the first pressing block 413*a* and the first guide rod 416*a* move synchronously. Alternatively, the first elastic member 415*a* may be a torsion spring and is sleeved on the first guide rod 416*a*.

Specifically, in the embodiment, a downstream end of the first pressing block 413*a* is provided with a first wheel 4131*a*. In this way, when the first driving member 411*a* drives the first moving base 412*a* to move towards the second pressing mechanism 42*a*, the work strip winds around the first wheel 4131*a* in a process that the first pressing block 413*a* presses the work strip towards the second pressing mechanism 42*a*, so as to avoid the downstream end of the first pressing block 413*a* from scratching the work strip.

It can be understood that the upstream and downstream as well as the upstream end and downstream end in this text are relative to a strip movement direction. In other words, a position where the strip passes firstly is the upstream or upstream end, and a position where the strip passes later is the downstream or downstream end.

Specifically, in the embodiment, the mounting base plate 50*a* is provided with a first guide rail (not shown in figures). The first moving base 412*a* is arranged on the first guide rail in a sliding manner, so that the first guide rail is used to guide a movement of the first moving base 412*a* close to or away from the second pressing mechanism 42*a*, making pressing and cutting actions towards the spare strip stable and reliable.

In the embodiment of the present application, the second pressing mechanism 42*a* includes a second driving member 421*a*, a second moving base 422*a*, a second pressing block 423*a*, and a second cutter 424*a*. The second driving member 421*a* is connected to the second moving base 422*a* in a driving manner to drive the second moving base 422*a* to move close to or away from the first pressing mechanism 41*a*. The second pressing block 423*a* and the second cutter 424*a* are arranged on the second moving base 422*a* to move with the second moving base 422*a*.

When the second moving base 422*a* moves close to the first pressing mechanism 41*a*, the second moving base 422*a* drives the second pressing block 423*a* to press the spare strip on the support mechanism 43*a*, and drives the second cutter 424*a* to cut off the spare strip. Or, when the second moving base 422*a* moves close to the first pressing mechanism 41*a*, the second moving base 422*a* drives the second pressing block 423*a* to press the work strip and the cutting end of the spare strip on the first pressing mechanism 41*a*.

Alternatively, the second driving member 421*a* may adopt a cylinder. When the support mechanism 43*a* extends into the pressing passage ba, a distance between the second pressing block 423*a* and the support mechanism 43*a* is relatively small, usually several millimeters, and is much smaller than a distance between the second pressing block 423*a* and the first pressing block 413*a* of the first pressing mechanism 41*a*. In this way, when the cylinder drives second pressing block 423*a* to move towards the first pressing mechanism 41*a* of the first pressing mechanism 41*a*, the support mechanism 43*a* blocks the second pressing block 423*a* when extending into the pressing passage ba, the second pressing block 423*a* abuts against the support mechanism 43*a*, so that the spare strip is pressed on the support mechanism 43*a* and cut off by the second cutter 424*a*. The support mechanism 43*a* cannot block the second pressing block 423*a* when not extending into the pressing passage ba, the second pressing block 423*a* moves to abut against the first pressing block 413*a* of the first pressing mechanism 41*a*, and the work strip and the cutting end of the spare strip are pressed on the first pressing block 413*a* of the first pressing mechanism 41*a*.

Specifically, in the embodiment, the second pressing mechanism 42*a* further includes a second elastic member 425*a*, and the second pressing block 423*a* is movably connected to the second moving base 422*a*. Two opposite ends of the second elastic member 425*a* abut against the second pressing block 423*a* and the second moving base 422*a* respectively, which is used to provide a pretension force that makes the second pressing block 423*a* move towards the first pressing mechanism 41*a* relative to the second moving base 422*a*. The second pressing block 423*a* has a second anti-collision groove (not shown in figures) for the second cutter 424*a* to pass through. In this way, during the strip preparation process, the spare strip is pulled to pass through the pressing passage ba along the second pressing block 423*a*, and the support mechanism 43*a* is controlled to extend into the pressing passage ba. Then, the second driving member 421*a* is used to drive the second moving base 422*a* to move towards the first pressing mechanism 41*a*. Firstly, the second pressing block 423*a* presses the spare strip on the support mechanism 43*a* (pressing the second elastic member 425*a*). As the second moving base 422*a* continues moving towards the first pressing mechanism 41*a* (continuing pressing the second elastic member 425*a*), the second cutter 424*a* passes through the second anti-collision groove of the second pressing block 423*a*, and cuts off the spare strip pressed by the second pressing block 423*a* on the support mechanism 43*a*. When it is necessary to release the pressing towards the spare strip, the second driving member 421*a* is used to drive the second moving base 422*a* to move away from the first pressing mechanism 41*a*. Firstly, the second cutter 424*a* moves with the second moving base 422*a* and exits the second anti-collision groove. As the second moving base 422*a* continues moving away from the first pressing mechanism 41*a*, the second pressing block 423*a* is driven to separate from the support mechanism 43*a* until it returns to an initial position.

Specifically, in the embodiment, the second pressing mechanism 42*a* further includes a second guide rod 426*a*. The second guide rod 426*a* is connected to the second moving base 422*a* in a sliding manner, and an end of the second guide rod 426*a* facing towards the first pressing mechanism 41 is fixedly connected to the second pressing block 423*a*. Thus, a movement of the second pressing block 423*a* is guided by a sliding of the second guide rod 426*a* relative to the second moving base 422*a*, making the second pressing block 423*a* pressing the strip more stable and reliable. Further, the second moving base 422*a* has a second guide hole (not shown in figures). The second guide rod 426*a* slides in and fits with the second guide hole, and an end of the second guide rod 426*a* away from the first pressing mechanism 41*a* is connected to a second limit block 4261*a*. The second limit block 4261*a* is used to avoid the second guide rod 426*a* from falling off from the second guide hole. An end of the second guide rod 426*a* facing towards the first pressing mechanism 41*a* is fixedly connected to the second pressing block 423*a*, so that the second pressing block 423*a* and the second guide rod 426*a* move synchronously. Alternatively, the second elastic member 425a may be a torsion spring and is sleeved on the second guide rod 426a.

Specifically, in the embodiment, a downstream end of the second pressing block 423a is provided with a second wheel 4241a. In this way, when the second driving member 421a drives the second moving base 422a to move towards the first pressing mechanism 41a, the work strip winds around the second wheel 4241a in a process that the second pressing block 423a presses the work strip towards the first pressing block 413a of the first pressing mechanism 41a, so as to avoid the downstream end of the second pressing block 423a from scratching the work strip.

Specifically, in the embodiment, the mounting base plate 50a is provided with a second guide rail (not shown in figures). The second moving base 422a is arranged on the second guide rail in a sliding manner, so that the second guide rail is used to guide a movement of the second moving base 422a close to or away from the first moving base 412a of the first pressing mechanism 41a, making pressing and cutting actions towards the spare strip stable and reliable.

It should be noted that since the first moving base 412a and the second moving base 422a move close to or away from each other in a same direction, the first guide rail and the second guide rail can be a same guide rail. Of course, in other embodiments, two guide rails extending longitudinally in the same direction can also be set as the first guide rail and the second guide rail, which are not limited here.

Please refer to FIGS. 13 and 14, in an embodiment of the present application, the support mechanism 43a includes a third driving member 431a and a support base 432a. The third driving member 431a and the support base 432a are connected in a driving manner to drive the support base 432a to extend into or exit the pressing passage ba. Alternatively, the third driving member 431a may be a cylinder.

Specifically, in the embodiment, the support mechanism 43a further includes a mounting plate 433a. The mounting plate 433a is connected to the third driving member 431a in a driving manner, and the support base 432a is mounted at an end of the mounting plate 433a facing towards the pressing passage ba, thereby makes the third driving member 431a drive the mounting plate 433a and the support base 432a to move together, so that the support base 432a extends into or exits the pressing passage ba between the first pressing block 413a and the second pressing block 423a. The mounting plate 433a is provided with a first transition roller 61a for the work strip to wind around, so that the work strip passing through the pressing passage ba between the first pressing block 413a and the second pressing block 423a is transported downstream under guidance of the first transition roller 61a. Further, the first transition roller 61a includes at least two transition rollers, and the work strip winds around each first transition roller 61a in an S shape.

Specifically, in the embodiment, the support base 432a has a first abutting part 432aa corresponding to the first pressing block 413a. When the support base 432a extends into the pressing passage ba, the first pressing block 413a moves close to the second pressing block 423a and abuts against the first abutting part 432aa, so as to press the spare strip between the first pressing block 413a and the first abutting part 432aa on the first abutting part 432aa. Further, the first abutting part 432aa is provided with a first cutter groove (not shown in figures) corresponding to the first cutter 414a. When cutting off the spare strip, the first cutter 414a passes through the first anti-collision groove and then cuts into the first cutter groove to ensure that the spare strip between the first pressing block 413a and the first abutting part 432aa is cut off.

Specifically, in the embodiment, the support base 432a has a second abutting part 432ba corresponding to the second pressing block 423a. When the support base 432a extends into the pressing passage ba, the second pressing block 423a moves close to the first pressing block 413a and abuts against the second abutting part 432ba, so as to press the spare strip between the second pressing block 423a and the second abutting part 432ba on the second abutting part 432ba. Further, the second abutting part 432ba is provided with a second cutter groove (not shown in figures) corresponding to the second cutter 424a. When cutting off the spare strip, the second cutter 424a passes through the second anti-collision groove and then cuts into the second cutter groove to ensure that the spare strip between the second pressing block 423a and the second abutting part 432ba is cut off.

It should be noted that during the roll replacing process, when the first pressing block 413a presses the work strip and the cutting end of the spare strip on the second pressing block 423a, the work strip and the cutting end of the spare strip are adhered to each other. At this time, a stroke of the first driving member 411a is used to control a compression amount of the first elastic member 415a, so that the first cutter 414a will not extend from the first anti-collision groove of the first pressing block 413a, and the second cutter 424a will not extend from the second anti-collision groove of the second pressing block 423a, as to avoid cutting off the work strip and the spare strip.

When the second pressing block 423a presses the work strip and the cutting end of the spare strip on the first pressing block 413a, the work strip and the cutting end of the spare strip are adhered to each other. At this time, a stroke of the second driving member 421a is used to control a compression amount of the second elastic member 425a, so that the second cutter 424a will not extend from the second anti-collision groove of the second pressing block 423a, and the second cutter 414a will not extend from the first anti-collision groove of the first pressing block 413a, so as to avoid cutting off the work strip and the spare strip.

In the embodiment of the present application, the roll replacing device further includes a correction member (not shown in the figure). The correction member includes a first correction roller 60aa arranged downstream of the first pressing mechanism 41a and a second correction roller 60ba arranged downstream of the second pressing mechanism 42a. The first correction roller 60aa is used to position the spare strip passing through the pressing passage ba along the first pressing block 413a, so as to correct a deflection occurring during a process for pulling the spare strip. The second correction roller 60ba is used to position the spare strip passing through the pressing passage ba along the second pressing block 423a, so as to correct a deflection occurring during the process for pulling the spare strip.

Of course, further, the spare strip passing through the pressing passage ba along the first pressing block 413a can also be wound and fixed on the first correction roller 60aa, so that the first correction roller 60aa plays a role of both correcting and fixing the spare strip. Similarly, the spare strip passing through the pressing passage ba along the second pressing block 423a can also be wound and fixed on the second correction roller 60ba. In this way, when the spare strip passes through the pressing passage ba along the first pressing block 413a, and the work strip passes through the pressing passage ba from between the spare strip and the second pressing block 423a, the work strip passes through the pressing passage ba and is transported downstream, and the spare strip passes through the pressing passage ba and is wound and fixed on the first correction roller 60*aa*, so that the spare strip is pressed on the first abutting part 432*aa* of the support base 432*a* by the first pressing block 413*a*, and is cut off by the first cutter 414*a*. This ensures the consistency of the size of the starting end of the spare strip during each roll replacing, which is conducive to improving the strip connection effect. When the spare strip passes through the pressing passage ba along the second pressing block 423*a* and the work strip passes through the pressing passage ba from between the spare strip and the first pressing block 413*a*, the work strip passes through the pressing passage ba and is transported downstream, the spare strip passes through the pressing passage ba and is wound and fixed on the second correction roller 60*ba*, so that the spare strip is pressed on the second abutting part 432*ba* of the support base 432*a* by the second pressing block 423*a*, and is cut off by the second cutter 424*a*. This ensures the consistency of the size of the starting end of the spare strip during each roll replacing, which is conducive to improving the strip connection effect. Specifically, the first correction roller 60*aa* and the second correction roller 60*ba* can be mounted on the mounting base plate 50*a*.

Further, both the first correction roller 60*aa* and the second correction roller 60*ba* can rotate around their own axis in a controlled manner. In this way, when the spare strip wound and fixed on the first correction roller 60*aa* is cut off by the first cutter 414*a*, the first correction roller 60*aa* rotates around its own axis, so that an end of the spare strip connected to the first correction roller 60*aa* is rolled up by the first correction roller 60*aa*. When the spare strip wound on the second correction roller 60*ba* is cut off by the second cutter 424*a*, an end of the spare strip connected to the second correction roller 60*ba* is rolled up by the second correction roller 60*ba*.

It should be noted that a rotation of the first correction roller 60*aa* around its own axis can be driven by the rolling-up driving mechanism in the prior art, and thus it will not be elaborated here. A rotation of the second correction roller 60*ba* around its own axis can be driven by the rolling-up driving mechanism in the prior art, and thus it will not be elaborated here.

Figure 16:
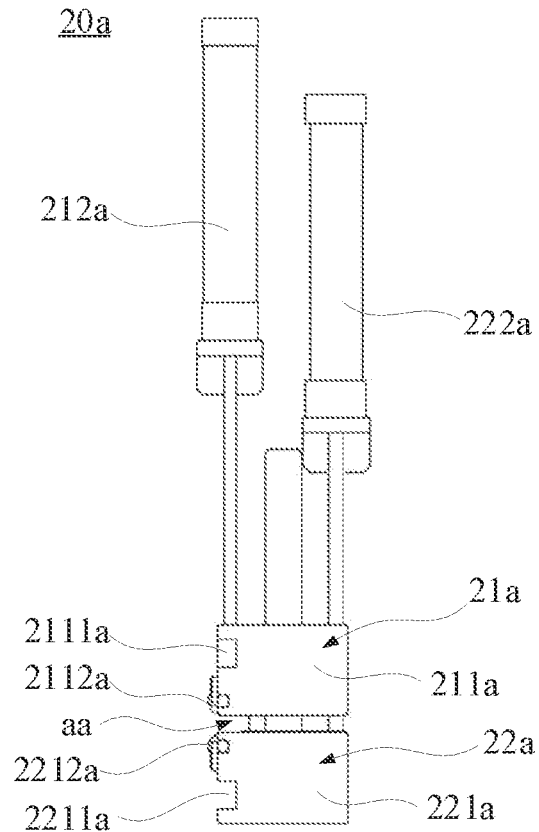
FIG. 16 is a schematic structural diagram of a roll replacing member of the roll replacing device as shown in FIG. 12.

Please refer to FIG. 13 and FIG. 16, in an embodiment of the present application, the roll replacing member 20*a* includes the first roll replacing mechanism 21*a* and the second roll replacing mechanism 22*a* that are oppositely arranged. A roll replacing passage aa is formed between the first roll replacing mechanism 21*a* and the second roll replacing mechanism 22*a* for the work strip and the spare strip to pass through. The first roll replacing mechanism 21*a* is configured to move towards the second roll replacing mechanism 22*a* to press the work strip and spare strip on the second roll replacing mechanism 22*a*. The second roll replacing mechanism 22*a* is configured to move towards the first roll replacing mechanism 21*a* to press the work strip and spare strip on the first roll replacing mechanism 21*a*.

In this way, when the work strip approaches the first roll replacing mechanism 21*a* and passes through the roll replacing passage aa, and the spare strip approaches the second roll replacing mechanism 22*a* and passes through the roll replacing passage aa, during the roll replacing process, the first roll replacing mechanism 21*a* moves towards the second roll replacing mechanism 22*a* to press the work strip and the spare strip on the second roll replacing mechanism 22*a*. When the work strip approaches the second roll replacing mechanism 22*a* and passes through the roll replacing passage aa, and the spare strip approaches the first roll replacing mechanism 21*a* and passes through the roll replacing passage aa, during the roll replacing process, the second roll replacing mechanism 22*a* moves towards the first roll replacing mechanism 21*a* to press the work strip and the spare strip on the first roll replacing mechanism 21*a*.

Specifically, in the embodiment, the first roll replacing mechanism 21*a* includes a first pushing block 211*a* and a first pressing driving member 212*a*. The first pushing block 211*a* is movably connected to the mounting base plate 50*a*. The first pressing driving member 212*a* is mounted on the mounting base plate 50*a* and is connected to the first pushing block 211*a* in a driving manner to drive the first pushing block 211*a* to move towards the second roll replacing mechanism 22*a*, so that the work strip and the spare strip passing through the roll replacing passage aa are pressed on the second roll replacing mechanism 22*a* and are further adhered to each other. Alternatively, the first pressing driving member 212*a* may be a cylinder.

Further, a first sliding rail can be arranged on the mounting base plate 50*a*, and a first sliding block is arranged on the first pushing block 211*a*. The first sliding block slides on and fits with the first sliding rail, so as to guide a movement of the first pushing block 211*a* close to or away from the second roll replacing mechanism 22*a*. Of course, the first sliding rail and the first sliding block are not necessary. That is, in some embodiments, the first sliding rail and the first sliding block may not be set, and the first pushing block 211*a* may be directly mounted on a driving end of the first pressing driving member 212*a*.

Specifically, in the embodiment, an upstream end of the first pushing block 211*a* is provided with a third wheel 2112*a*. In this way, when the first pushing block 211*a* moves towards the second roll replacing mechanism 22*a*, the work strip winds around the third wheel 2112*a* in a process that the first pushing block 211*a* presses the work strip towards the second roll replacing mechanism 22*a*, so as to avoid the upstream end of the first pushing block 211*a* from scratching the work strip.

Specifically, in the embodiment, the second roll replacing mechanism 22*a* includes a second pushing block 221*a* and a second pressing driving member 222*a*. The second pushing block 221*a* is movably connected to the mounting base plate 50*a*. The second pressing driving member 222*a* is mounted on the mounting base plate 50*a* and is connected to the second pushing block 221*a* in a driving manner to drive the second pushing block 221*a* to move towards the first pushing block 211*a* of the first roll replacing mechanism 21*a*, so that the work strip and the spare strip passing through the roll replacing passage aa are pressed on the first pushing block 211*a* of the first roll replacing mechanism 21*a* and are further adhered to each other. Alternatively, the second pressing driving member 222*a* may be a cylinder.

Further, a second sliding rail can be arranged on the mounting base plate 50*a*, and a second sliding block is arranged on the second pushing block 221*a*. The second sliding block slides on and fits with the second sliding rail, so as to guide a movement of the second pushing block 221*a* close to or away from the first pushing block 211*a* of the first roll replacing mechanism 21*a*.

It should be noted that since the first pushing block 211*a* and the second pushing block 221*a* move close to or away from each other in a same direction, the first sliding rail and the second sliding rail can be a same sliding rail. Of course, in other embodiments, two sliding rails extending longitudinally in the same direction can also be set as the first sliding rail and the second sliding rail, which are not limited here.

Specifically, in the embodiment, an upstream end of the second pushing block 221a is provided with a fourth wheel 2212a. In this way, when the second pushing block 221a moves towards the first pushing block 211a of the first roll replacing mechanism 21a, the work strip winds around the fourth wheel 2212a in a process that the second pushing block 221a presses the work strip towards the first pushing block 211a of the first roll replacing mechanism 21a, so as to avoid the upstream end of the second pushing block 221a from scratching the work strip.

Figure 17:
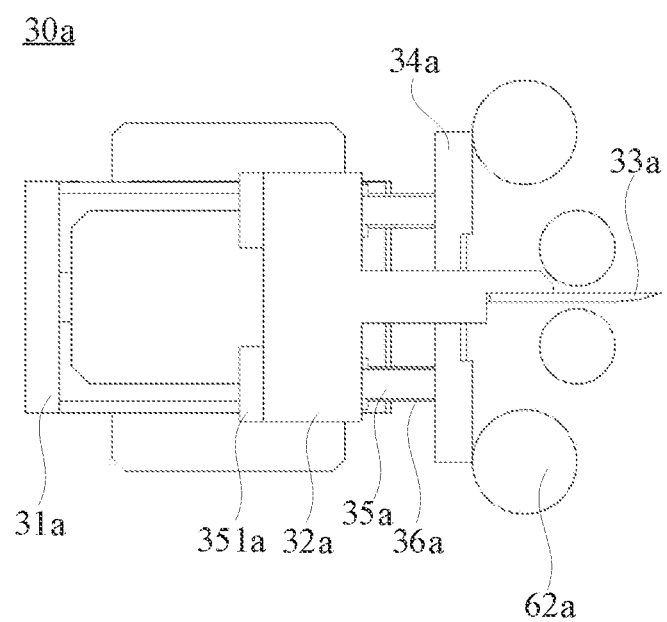
FIG. 17 is a schematic structural diagram of a cutting member of the roll replacing device as shown in FIG. 12.

Please refer to FIG. 13 and FIG. 17, in an embodiment of the present application, a plurality of second transition rollers 62a are arranged upstream of the roll replacing member 20a, and the plurality of second transition rollers 62a are used to guide the work strip and the spare strip into the roll replacing passage aa. That is, the work strip and the spare strip unwound and output by the unwinding member 10a are respectively guided into the roll replacing passage aa through the corresponding second transition rollers 62a.

In the embodiment of the present application, the cutting member 30a includes a cutting driving member 31a, a cutter base 32a, and a third cutter 33a. The cutting driving member 31a is connected to the cutter base 32a in a driving manner, and the third cutter 33a is arranged on the cutter base 32a. The cutter base 32a moves under a drive of the cutting driving member 31a, thereby driving the third cutter 33a to cut off the work strip at an input end of the roll replacing passage aa.

Specifically, in the embodiment, the cutting member 30a further includes a third pressing block 34a, which is arranged on the cutter base 32a. The cutter base 32a moves under the drive of the cutting driving member 31a, so as to drive the third pressing block 34a to press the work strip and the spare strip respectively on the corresponding second transition roller 62a, and to drive the third cutter 33a to cut off the work strip between the input end of the roll replacing passage aa and the third pressing block 34a. In this way, the third pressing block 34a presses and fixes the work strip to the corresponding second transition roller 62a. At a same time, the first pushing block 211a and the second pushing block 221a press and fix the work strip, so that when the third cutter 33a cuts off the work strip, the parts on both sides of a cutting line of the work strip are pressed and fixed, which is conducive to improving the cutting quality.

Further, the upstream end of the first pushing block 211a has a third cutter groove 2111a (see FIG. 16). When the first pushing block 211a moves towards the second pushing block 221a and presses the work strip and the spare strip on the second pushing block 221a, the third cutter groove 2111a is aligned with the third cutter 33a. At this time, when the cutter base 32a moves towards the roll replacing member 20a, the cutter base 32a drives the third pressing block 34a to press the work strip and the spare strip on the corresponding second transition roller 62a, and drives the third cutter 33a to cut into the third cutter groove 2111a of the first pushing block 211a to cut off the work strip. In this way, a setting of the third cutter groove 2111a can avoid a contact between the third cutter 33a and the first pushing block 211a that results in damage to the third cutter 33a and the first pushing block 211a.

Further, the upstream end of the second pushing block 221a has a fourth cutter groove 2211a (see FIG. 17). When the second pushing block 221a moves towards the first pushing block 211a and presses the work strip and the spare strip on the first pushing block 211a, the fourth cutter groove 2211a is aligned with the third cutter 33a. At this time, the cutter base 32a can move towards the roll replacing member 20a, so as to drive the third pressing block 34a to press the work strip and the spare strip on the corresponding second transition roller 62a, and to drive the third cutter 33a to cut into the fourth cutter groove 2211a of the second pushing block 221a to cut off the work strip. In this way, a setting of the fourth cutter groove 2211a can avoid a contact between the third cutter 33a and the second pushing block 221a that results in damage to the third cutter 33a and the second pushing block 221a.

Specifically, in the embodiment, the cutting member 30a further includes a third elastic member 36a. Two opposite ends of the third elastic member 36a abut against between the third pressing block 34a and the cutter base 32a, so as to provide a pretension force that makes the third pressing block 34a move towards the roll replacing member 20a relative to the cutter base 32a. In this way, during cutting, the cutting driving member 31a drives the cutter base 32a to move towards the roll replacing member 20a. The third pressing block 34a firstly abuts against the corresponding second transition roller 62a, so as to press and fix the work strip and the spare strip to the corresponding second transition roller 62a respectively. As the cutter base 32a continues moving towards the roll replacing member 20a (continue pressing the third elastic member 36a), the third cutter 33a contacts the work strip, and then cuts off the work strip. That is, during the cutting, the third cutter 33a cuts off the work strip after the third pressing block 34a presses the work strip.

Further, the cutting member 30a further includes a third guide rod 35a. The third guide rod 35a is connected to the cutter base 32a in a sliding manner. An end of the third guide rod 35a facing towards the roll replacing 20a is fixedly connected to the third pressing block 34a. Thus, a movement of the third pressing block 34a is guided by a sliding of the third guide rod 35a relative to the cutter base 32a, making the third pressing block 34a pressing the strip more stable and reliable. Further, the cutter base 32a has a third guide hole (not shown in figures). The third guide rod 35a slides in and fits with the third guide hole, and an end of the third guide rod 35a away from the roll replacing member 20a is connected to a third limit block 351a. The third limit block 351a is used to avoid the third guide rod 35a from falling off from the third guide hole. An end of the third guide rod 35a facing towards the roll replacing member 20a is fixedly connected to the third pressing block 34a, so that the third pressing block 34a and the third guide rod 35a move synchronously. Alternatively, the third elastic member 36a may be a torsion spring and is sleeved on third guide rod 35a.

An operation process of the roll replacing device of the present application is described below in combination with the accompanying drawings:

Taking the strip unwound and output by the first unwinding mechanism 11a as the work strip, and the strip unwound and output by the second unwinding mechanism 12a as the spare strip as example, the work strip passes through the roll replacing passage aa and the pressing passage ba in sequence, winds around the first transition roller 61a, and is transported downstream.

Strip preparation process: firstly, the spare strip is pulled to pass through the roll replacing passage aa along the second pushing block 221a (that is, passing through the roll replacing passage aa from between the work strip and the second pushing block 221a), and pass through the pressing passage ba along the second pressing block 423a (that is, passing through the pressing passage ba from between the work strip and the second pressing block 423*a*), and then wound on the second correction roller 60*ba*.

Then, the third driving member 431*a* drives the support base 432*a* to move left to the pressing passage ba between the first pressing block 413*a* and the second pressing block 423*a*.

Then, the second driving member 421*a* drives the second moving base 422*a* to move towards the first moving base 412*a*, so that the second pressing block 423*a* presses the spare strip on the second abutting part 432*ba* of the support base 432*a*, and the second cutter 424*a* cuts off the spare strip. At this time, the cutting end of the spare strip passing through the roll replacing passage aa is located on the second pressing block 423*a*.

Roll replacing process: firstly, when a material roll on the first unwinding mechanism 11*a* is about to be used up, the first pressing driving member 212*a* drives the first pushing block 211*a* to move towards the second pushing block 221*a* to press the work strip and the spare strip on the second pushing block 221*a*, so that the parts of the spare strip and the work strip that are in the roll replacing passage aa are adhered to each other. At this time, the cutting driving member 31*a* of the cutting member 30*a* can drive the cutter base 32*a* to move right, so that the third pressing block 34*a* presses the work strip and the spare strip on the corresponding second transition rollers 62*a*, and the third cutter 33*a* cuts off the work strip. After cutting, the cutting driving member 31*a* can drive the cutter base 32*a* to move left and resets.

After the first pushing block 211*a* presses the work strip and the spare strip on the second pushing block 221*a*, the second driving member 421*a* drives the second moving base 422*a* to move away from the first moving base 412*a*, so that the second pressing block 423*a* separates from the second abutting part 432*ba* of the support base 432*a*.

Then, the third driving member 431*a* drives the support base 432*a* to move right, so that the support base 432*a* exits the pressing passage ba between the first pressing block 413*a* and the second pressing block 423*a*. At this time, the cutting part of the spare strip (that is, a part connected to the second correction roller 60*ba* after cutting) can be taken away.

Then, the first driving member 411*a* drives the first moving base 412*a* to move towards the second moving base 422*a* until the first pressing block 413*a* presses the work strip and the cutting end of the spare strip on the second pressing block 423*a*, so that the work strip and a cutting end of the spare strip are adhered to each other.

Finally, the first driving member 411*a* drives the first moving base 412*a* to move away from the second moving base 422*a* and resets, so as to release the pressing towards the work strip and the cutting end of the spare strip. At a same time, the first pressing driving member 212*a* drives the first pushing block 211*a* to move away from the second pushing block 221*a* and resets, so as to relieve the pressing towards the work strip and the spare strip. At this time, the spare strip can be transported downstream with the work strip. That is, the spare strip unwound and output by the second unwinding mechanism 12*a* is converted into the work strip. In addition, at this time, the material roll on the first unwinding mechanism 11*a* can be replaced and the strip preparation is performed for the next roll replacing. A next roll replacing process is similar to the above the roll replacing process, and thus will not be repeated here.

Based on the above roll replacing device, the present application further provides an adhesive tape sticking equipment including a roll replacing device as described in any one embodiment as described above. Specifically, the adhesive tape sticking equipment further includes a glue preparation device and a glue adhering device. The glue preparation device is arranged downstream of the roll replacing device, and is used to cut off a work strip transported by the roll replacing device into an adhesive tape with a preset length. The glue adhering device is arranged downstream of the glue preparation device to adhere the adhesive tape with the preset length to a surface of an electrode plate.

Further, the adhesive tape sticking equipment includes two sets of roll replacing devices, glue preparation devices, and glue adhering devices, in which one set of the glue adhering devices are used to adhere the adhesive tape to a surface of one side of the electrode plate, and in which another set of the glue adhering devices are used to adhere the adhesive tape to a surface of another side of the electrode plate.

Technical features of the above-described embodiments can be combined arbitrarily. In order to simplify the description, all possible combinations of the technical features in the above-described embodiments are not described. However, as long as there is no contradiction in the combination of these technical features, it should be considered as the scope recorded in this specification.

The above embodiments only express several embodiments of the application, and the description is more specific and detailed, but it cannot be understood as a limitation on the scope of the patent application. It should be noted that for those skilled in the art, several modifications and improvements can be made without departing from the concept of the application, which belong to the protection scope of the present application. Therefore, the protection scope of the patent of the present application shall be subject to the appended claims.

What is claimed is:

1. A roll replacing device, comprising:
an unwinding member comprising a first unwinding mechanism and a second unwinding mechanism for unwinding and outputting a first strip and a second strip respectively;
a roll replacing member being arranged downstream of the unwinding member and comprising a first roll replacing mechanism and a second roll replacing mechanism that are oppositely arranged, wherein a roll replacing passage for the first strip and the second strip to pass through is formed between the first roll replacing mechanism and the second roll replacing mechanism, the first roll replacing mechanism is configured to move towards the second roll replacing mechanism to press the first strip and the second strip on the second roll replacing mechanism, and the second roll replacing mechanism is configured to move towards the first roll replacing mechanism to press the first strip and the second strip on the first roll replacing mechanism;
a cutting member used to cut off the first strip or the second strip pressed between the first roll replacing mechanism and the second roll replacing mechanism; and
an end pressing member being arranged downstream of the roll replacing member and comprising a first pressing mechanism, a second pressing mechanism, and a support mechanism,
wherein a pressing passage for a work strip and a spare strip to pass through is formed between the first pressing mechanism and the second pressing mechanism, and the support mechanism is able to be controlled to extend into or exit the pressing passage;

when the support mechanism extends into the pressing passage, the first pressing mechanism or the second pressing mechanism can be controlled to press the spare strip on the support mechanism and cut off the spare strip pressed on the support mechanism; and when the support mechanism exits the pressing passage, the first pressing mechanism or the second pressing mechanism can be controlled to move and press a cutting end of the spare strip and the work strip between the first pressing mechanism and the second pressing mechanism.

2. The roll replacing device as claimed in claim 1, wherein the first roll replacing mechanism comprises a first driving member and a first pushing block; and the first driving member is connected to the first pushing block in a driving manner to drive the first pushing block to move towards the second roll replacing mechanism.

3. The roll replacing device as claimed in claim 1, wherein the first pushing block has a first winding surface for the first strip passing through the roll replacing passage to wind around, and the first winding surface is configured to suction the first strip to wind around.

4. The roll replacing device as claimed in claim 1, wherein the first roll replacing mechanism further comprises a first clamping mechanism, the first clamping mechanism includes a first clamping driving member and a first clamping block connected to the first clamping driving member in a driving manner, and the first clamping block is arranged corresponding to an input end of the roll replacing passage, and clamps the first strip pressed between the first roll replacing mechanism and the second roll replacing mechanism under a drive of the first clamping driving member; and the cutting member is used to cut off the first strip from a position between the input end of the roll replacing passage and the first clamping block.

5. The roll replacing device as claimed in claim 1, wherein the roll replacing device comprises a first state and a second state;

in the first state of the roll replacing device, when the support mechanism extends into the pressing passage, the first pressing mechanism is controlled to press the spare strip on the support mechanism and cut off the spare strip pressed on the support mechanism; when the support mechanism exits the pressing passage, the second pressing mechanism is controlled to move towards the first pressing mechanism and press the cutting end of the spare strip and the work strip in the pressing passage on the first pressing mechanism; and in the second state of the roll replacing device, when the support mechanism extends into the pressing passage, the second pressing mechanism is controlled to press the spare strip on the support mechanism and cut off the spare strip pressed on the support mechanism; when the support mechanism exits the pressing passage, the first pressing mechanism is controlled to move towards the second pressing mechanism and press the cutting end of the spare strip and the work strip in the pressing passage on the second pressing mechanism.

6. The roll replacing device as claimed in claim 1, wherein the first pressing mechanism comprises a first driving member, a first moving base, a first pressing block, and a first cutter; and the first driving member is connected to the first moving base in a driving manner to drive the first moving base to move close to or away from the second pressing mechanism, and the first pressing block and the first cutter are arranged on the first moving base;

when the first moving base moves close to the second pressing mechanism, the first moving base drives the first pressing block to press the spare strip on the support mechanism, and drives the first cutter to cut off the spare strip; or, when the first moving base moves close to the second pressing mechanism, the first moving base drives the first pressing block to press the work strip and the cutting end of the spare strip on the second pressing mechanism.

7. The roll replacing device as claimed in claim 6, wherein the first pressing mechanism further comprises a first elastic member, the first pressing block is movably connected to the first moving base, and two opposite ends of the first elastic member abut against the first pressing block and the first moving base respectively, and is used to provide a pretension force that makes the first pressing block move towards the second pressing mechanism relative to the first moving base; and the first pressing block has a first anti-collision groove for the first cutter to pass through.

8. The roll replacing device as claimed in claim 6, wherein a downstream end of the first pressing block is provided with a first wheel.

9. The roll replacing device as claimed in claim 1, wherein the support mechanism comprises a driving member and a support base; and the driving member is connected to the support base in a driving manner to drive the support base to move and extend into or exit the pressing passage.

10. The roll replacing device as claimed in claim 9, wherein the support mechanism further comprises a mounting plate, the mounting plate is connected to the driving member in a driving manner, and the support base is mounted at an end of the mounting plate facing towards the pressing passage; and the mounting plate is provided with a first transition roller for the work strip to wind around.

11. The roll replacing device as claimed in claim 1, wherein a plurality of transition rollers are arranged upstream of the roll replacing member, and the plurality of transition rollers are used to guide the work strip and the spare strip into the roll replacing passage; and the cutting member comprises a cutting driving member, a cutter base, a third cutter, and a third pressing block, the cutting driving member is connected to the cutter base in a driving manner, the third cutter and the third pressing block are arranged on the cutter base, and the cutter base moves under a drive of the cutting driving member to drive the third pressing block to press the work strip and the spare strip on the corresponding transition rollers respectively, and to drive the third cutter to cut off the work strip between the input end of the roll replacing passage and the third pressing block.

12. An adhesive tape sticking equipment, comprising a roll replacing device, wherein the roll replacing device comprises:

an unwinding member comprising a first unwinding mechanism and a second unwinding mechanism for unwinding and outputting a first strip and a second strip respectively;

a roll replacing member being arranged downstream of the unwinding member and comprising a first roll replacing mechanism and a second roll replacing mechanism that are oppositely arranged, wherein a roll replacing passage for the first strip and the second strip to pass through is formed between the first roll replacing mechanism and the second roll replacing mechanism, the first roll replacing mechanism is configured to move towards the second roll replacing mechanism to press the first strip and the second strip on the second roll replacing mechanism, and the second roll replacing mechanism is configured to move towards the first roll replacing mechanism to press the first strip and the second strip on the first roll replacing mechanism;

a cutting member used to cut off the first strip or the second strip pressed between the first roll replacing mechanism and the second roll replacing mechanism; and an end pressing member being arranged downstream of the roll replacing member and comprising a first pressing mechanism, a second pressing mechanism, and a support mechanism, wherein a pressing passage for a work strip and a spare strip to pass through is formed between the first pressing mechanism and the second pressing mechanism, and the support mechanism is able to be controlled to extend into or exit the pressing passage;

when the support mechanism extends into the pressing passage, the first pressing mechanism or the second pressing mechanism can be controlled to press the spare strip on the support mechanism and cut off the spare strip pressed on the support mechanism; and when the support mechanism exits the pressing passage, the first pressing mechanism or the second pressing mechanism can be controlled to move and press a cutting end of the spare strip and the work strip between the first pressing mechanism and the second pressing mechanism.

* * * * *